US011027205B1

(12) United States Patent
Langrand et al.

(10) Patent No.: US 11,027,205 B1
(45) Date of Patent: Jun. 8, 2021

(54) VIDEO GAME PAGE PROVIDING INFORMATION AND FUNCTIONALITIES BASED ON VIDEO GAME LIFECYCLE AND USER CONTEXT

(71) Applicant: Sony Interactive Entertainment Inc., Tokyo (JP)

(72) Inventors: Sylvain Langrand, San Francisco, CA (US); Christopher DePizzol, Concord, CA (US); Yiwei Yang, San Francisco, CA (US); Anand Mehta, San Francisco, CA (US); Anastasiya Drake, San Francisco, CA (US); Anthony Graziano, London (GB)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 16/703,516

(22) Filed: Dec. 4, 2019

(51) Int. Cl.
*A63F 13/85* (2014.01)
*A63F 13/69* (2014.01)
*A63F 13/792* (2014.01)

(52) U.S. Cl.
CPC .............. *A63F 13/85* (2014.09); *A63F 13/69* (2014.09); *A63F 13/792* (2014.09); *A63F 2300/57* (2013.01)

(58) Field of Classification Search
None
See application file for complete search history.

(56) References Cited

U.S. PATENT DOCUMENTS

| 2014/0024457 A1* | 1/2014 | Justice | A63F 13/792 463/42 |
| 2014/0349721 A1* | 11/2014 | Dawson | A63F 13/35 463/1 |
| 2014/0357381 A1* | 12/2014 | Jung | G06Q 50/10 463/43 |
| 2015/0302514 A1* | 10/2015 | Trombetta | H04L 67/306 705/27.2 |

OTHER PUBLICATIONS

"Dynamic Web Page—Wikipedia", Available online at: URL:https://en.wikipedia.org/w/index.php?title=Dynamic_web_page&oldid=927644606, Nov. 23, 2019, pp. 1-5.
Chae et al., "XSLT Template Design for Generating the Web Presentation Layer", Software Engineering Conference 2003, Dec. 2003, pp. 396-404.
PCT/US2020/062206 , "International Search Report and Written Opinion", dated Mar. 18, 2021, 14 pages.

* cited by examiner

*Primary Examiner* — Jason T Yen
(74) *Attorney, Agent, or Firm* — Kilpatrick Townsend & Stockton LLP

(57) ABSTRACT

Techniques for providing information and functionalities based on a video game lifecycle and user context are described. In an example, a computer system presents a page as a single user interface to information and functionalities associated with a video game. The page is generated based on a layout that is specific to a phase of the lifecycle of the video game. The page is also customized based on a context of the user of the video game. The page is accessible to the user across the different phases of the video game's lifecycle. The computer system updates the phase through the different phases and based on changes to the user context, such that the page presents the most relevant and needed information and functionalities at any point in time.

21 Claims, 24 Drawing Sheets

VIDEO GAME PAGE PROVIDING INFORMATION AND FUNCTIONALITIES BASED ON VIDEO GAME LIFECYCLE AND USER CONTEXT

BACKGROUND

Graphical user interfaces (GUIs) are the predominant type of interfaces available to users for interacting with computer systems. A GUI is operable to present information and functionalities available from the computer systems.

In an example, a GUI is used for video games. In particular, a user operates a computing device, such as a video game console, that presents the GUI on a display. In particular, the GUI shows different interfaces to different video game-related applications. Each of the interfaces can be specific to a type of information and/or types of functionalities. For instance, the GUI shows links to available games, a search engine, and a video application. A user selection of a link may trigger the computing device to launch the corresponding video game and present video game content in a video game window. User input to the search engine may trigger the computing device to present search results. A user search for game help through the video application may trigger the computing device to present a video file that demonstrates how to play certain aspects of the video game.

Hence, to access the various information and functionalities, multiple interfaces within the GUI and navigations between these interfaces may be needed. There is a need for an improved GUI that allows better and more seamless access to the information and functionalities.

BRIEF SUMMARY

Techniques for providing information and functionalities based on a video game lifecycle and user context are described. In an example, a computer system is used for presentation of video game-related information. The computer system includes one or more processors and one or more non-transitory computer readable storage media (e.g., one or more memories) storing instructions that, upon execution by the one or more processors, cause the computer system to perform operations.

In an example, the operations include determining a phase of a lifecycle of a video game. A set of content and actions are associated with the video game are generated specifically for the phase. The operations also include setting a layout of a page associated with the video game based on the phase. The page is updated based on different phases of the lifecycle and is accessible in each of the different phases to a user. The operations also include receiving a request of the user for information about the video game, determining a context of the user in association with at least one of the video game or a video game platform from which the video game is available, and populating the page with the content and the actions. At least one of the content or the actions is customized based on the context. The operations also include presenting, in response to the request, the page as populated and according to the layout.

In an example, the operations further include determining a change to at least one of: the lifecycle from the phase to a second phase or the context of the user, and updating, based on the change, at least one of: the layout, the content, or the actions.

In an example, the operations further include receiving a user selection of an action presented in the page, determining that the lifecycle changed from the phase to a second phase based on the action, and updating, based on the second phase, at least one of: the layout, the content, or the actions. In this example, the operations can also include performing the action by at least: launching a process associated with the action, presenting information about the process in a window over the page, and switching a user control from the page to the window. Upon a completion of the process, the operations can also include closing the window, switching the user control to the page, and presenting the page as updated.

In an example, the layout includes a plurality of scrollable sections. Each of the sections includes an arrangement of content, actions, and tiles based on the phase. In this example, presenting the page comprises presenting a full scrollable section while also presenting a top of a next scrollable section. The full scrollable section can include a tile selectable to present a video file associated with the game. A background of the full scrollable section is set as a frame from the video file. In addition, at least one of content, an action, and a tile presented in the full scrollable section can be customized based on the context of the user. In this example, the operations can also include determining a change from the phase to a second phase of the lifecycle, and adding a new scrollable section to the page based on the change. At least one of additional content or an action are generated specifically for the second phase and are included in the new scrollable section.

In an example, the layout includes a first set of scrollable sections for an announce phase of the lifecycle, a second set of scrollable sections for a launched video game phase of the lifecycle, and a third set of scrollable sections for a user acquired video game phase of the lifecycle. The first set and the second set include a common scrollable section. The second set includes a scrollable section absent from the first set. In this example, a first set can include a cover section, a game media section, a game features section, a news section, and a game details section. The second set includes the cover section, the game media section, the game features section, the news section, and an add-ons section. The third set includes the cover section, the add-ons section, featured activities section, the news section, and a user generated content section. At least one of content or an action in the common scrollable section changes between the first set and the second set.

In an example, the phase is a post-acquisition phase. The at least one of the content or the actions is customized by determining a history of the user playing the video game and adding particular content to the page. The history is indicated by the context and comprises at least one of: achievements of the user, statistics of the user, or video game skills earned by the user. The particular content indicates the history.

In an example, the layout is set prior to receiving the request. The request is received based on a user selection of a link to the page. The page is populated after the user selection of the link.

In an example, the operations further include launching an instance of an application based on receiving the request. The instance populates the page. In this example, the operations also include receiving a second request for information about a second video game, launching a second instance of the application, and populating, by the second instance, a second page based on the context of the user and a phase of a lifecycle of the second video game.

In an example, the layout is set based on a layout template that is defined specifically for the phase and that is common to a plurality of video games.

In an example, the phase is a pre-acquisition phase. The actions comprise a video game acquire action that is located in the page based on the layout. In this example, the operations further include receiving a user selection of the video game acquire action, determining that the lifecycle changes to a post-acquisition phase, updating the page to present a video game play action based on the post-acquisition phase, and embedding a link to the page in a second page that presents information about a plurality of video games available to the user.

In an example, the video game page includes a video about the video game. The operations further include determining that the video comprises a spoiler based on the context of the user, and, based on the spoiler, performing at least one of: blocking a portion of the video that contains the spoiler from a presentation in the video game page or presenting an alert to the user in the video game page about the spoiler.

In an example, the phase is a post-acquisition phase. A link to the page is automatically added to one or more user interfaces other than the page.

DETAILED DESCRIPTION

Figure 1:
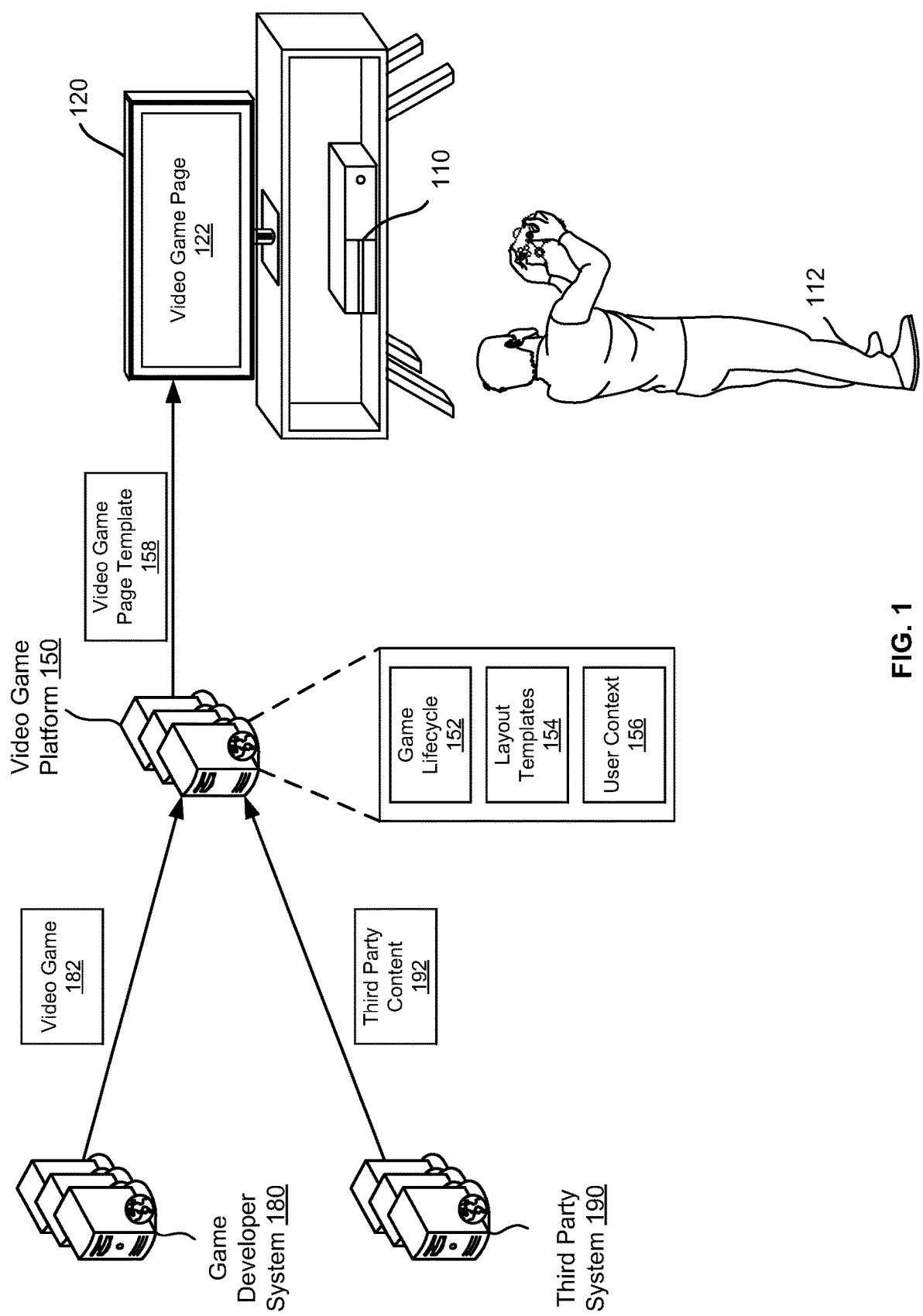
FIG. 1 illustrates an example of a computing environment for presenting a video game page, according to an embodiment of the present disclosure.

Generally, systems and methods for providing information and functionalities based on a video game lifecycle and user context are described. In an example, a computer system presents a GUI on a display to a user. The GUI includes a link to a video game page. Upon a user selection of the link or a particular user input (e.g., a combination of buttons on a video game controller), a page for a video game can be presented on the GUI. The video game page is generated based on a phase of a lifecycle of the video game and is customized based on a context of the user. The video game page includes all the needed information and functionalities for the lifecycle phase, while also the information and functionalities are personalized to the user. In this way, the video game page represents a single interface that the user can access over the different lifecycle phases and the different contexts such that at each point in time the same, single interface provides the most relevant information and functionalities to the user.

To illustrate, consider an example of a video game lifecycle that includes two phases: a pre-acquisition phase and a post-acquisition phase. In the pre-acquisition phase, the video game has been released by a developer through a video game platform, but has not been acquired by a user. In the post-acquisition phase, the video game has been acquired by the user through the video game platform.

A video game page is generated for both phases. The layout of the video game can vary with the phase. For instance, in the pre-acquisition phase, the video game page includes a cover section and a media section (e.g., one that shows a movie trailer about the video game), whereas in the post-acquisition phase, the video game page further includes a user-generated content section (e.g., one that shows a movie demonstration about how to play the video game). In addition, the content and actions shown in each of the sections can depend on the corresponding phase and/or a context of the user in association with the video game and/or the video game platform. For instance, the cover section for the pre-acquisition phase includes the game title from a video game franchise, a selectable button to acquire the video game, and text indicating that the user has already acquired a previously released game title that also belongs to the video game franchise. In comparison, the cover section is updated for the post-acquisition page to include a selectable button to launch the video game and a list of video game achievements of the user. Accordingly, the user relies in both phases on the video game page to access information and functionalities. In the pre-acquisition phase, the video game page introduces the video game page to the user and provides the relevant information and functionalities for acquiring it. In the post-acquisition phase, the video game page is updated to provide the relevant information and functionalities for playing the video game. The layout is similar in both phases to provide a seamless user experience and, yet, customized to provide a relevant user experience (e.g., the user-generated content section is added because the video demonstration is relevant to playing the video game in the post-acquisition phase). The information and functions are also customized in each phase to further improve the user experience.

Embodiments of the present disclosure provide many technical advantages over existing video game platforms. For instance, an existing video game platform typically relies on multiple pages to provide the relevant information and functionalities within each phase and across the different phases of a video game lifecycle. In particular, prior to acquiring a video game, a user may have to rely on a web browser to find information about the video game, may access a web page of the video game's developer to watch a video game trailer, and may download the video game from a game store of the video game platform. Once acquired, the user may launch the video game from library page of the video game platform and may invoke a video application (e.g., YOUTUBE) to watch a video demonstration. Each of these user interfaces and the underlying applications can provide a different user experience and can necessitate a specific computational burden and overhead to load and present.

In contrast, the embodiments of the present disclosure allow the use of a single video game page that includes the most relevant information and functionalities at each lifecycle phase and dependently on the latest context of the user. Hence, the user experience is significantly improved, whereby the need to rely on different applications and navigation between different user interfaces is eliminated. In addition, the layout can be common for different video games such that a similar user experience is provided for the different video games and yet the specific information and functionalities are adapted to each video game. Hence, a seamless and customized user experience is provided across the lifecycle of a video game and across many different video games. Further, the computational burden and overhead is significantly reduced. Rather than having to execute multiple applications, process multiple web requests and application program interface (API) calls, and support multiple interfaces, the use of a single application that supports the video game page is sufficient. The application can be optimized for the shortest possible latency and best possible user interface reactivity to user interactions with the video game page.

FIG. 1 illustrates an example of a computing environment for presenting a video game page, according to an embodiment of the present disclosure. As illustrated, the computing environment includes a video game console 110 communicatively coupled with a display 120, a video game platform 150, a game developer system 180, and a third party system 190. The video game console 110 is available to a video game player 112 (e.g., operated by the video game player 112 or associated with the video game player 112 under a user account). The video game platform 150 represents a computing system that provides video game-related services and, optionally, other computing services (e.g., multimedia streaming, social network access, etc.). Among the video game-related services, the video game platform 150 supports the presentation of a video game page 122 on the display, where the video game page 122 is associated with a video game, is generated based on a phase of the lifecycle of the video game, and is customized based on a context of the user 112 in association with the video game and/or the video game platform 150. The video game platform 150 may include content and/or actions in the video game page 122, where some of the content and/or actions may be received from the game developer system 180 and/or the third party system 190. Of course, multiple game developer systems, multiple third party systems, and/or multiple video game consoles can be communicatively coupled with the video game platform 150.

In an example, the video game platform 150 is managed by a service provider. Based on input of the service provider, the video game platform 150 stores information that defines phases for a lifecycle of a video game (this information is shown in FIG. 1 as game lifecycle 152) and layout templates 154 for each of the phases. The lifecycle and its phases can be common to many different video games, some of which can belong to different video game franchises and/or can be developed by different video game developers. Each of the layout templates 154 can correspond to a phase and can define sections and fields within each section for at least a set of content and actions to be presented in the video game page 122 specifically for the corresponding phase.

In addition, the video game platform 150 can track, based on a user permission, user activities and interactions within the video game and/or with the video game console 110, the video game platform 150, the game developer system 180, the third party system 190, and/or any other computing systems including other video game consoles and remote computing devices. Information about such activities and interactions can be stored as user context 156 and associated with the user 112 (e.g., can be stored in a user profile or under a user account). For instance, the user context 156 indicates whether the user 112 has acquired and/or played a video game, a history of game play (including with the video game, another unrelated video game, or another video game that belongs to the same video game franchise), video game statistics and achievements of the user 112, whether the user 112 has viewed video game content from the game developer system 180 (e.g., visited a web page thereof), whether the user 112 has viewed third party content 192 from the third party system 190 (e.g., visited a web page thereof), communications of the user 112 with other users about the video game or other video games, and the like.

The video game platform 150 can also receive a video game 182 from the game developer system 180. Receiving the video game 182 can include receiving the program code for the video game 182 (including different versions, add-ons, etc.) such that the video game itself 182 can become available for download or for execution to the user 112. Receiving the video game 182 also includes receiving a set of content and actions that are defined specifically for each phase of the lifecycle of the video game 182. The content and the actions can be added to the video game page 122 according to the layout templates 154 and based on the game lifecycle 152. Similarly, the video game platform 150 can receive third party content 192 from the third party system 190. The third party content 192 can be received via a pull mechanism or a push mechanism, is associated with the video game 182 and provides supplementary content and/or actions. For instance, the third part content 182 can include third party-generated video demonstrations about how to play the game 182, news about the video game 182, and/or add-ons to the video game 182.

In an example, the video game platform 150 generates a video game page template 158 according to the layout templates 154 and the game lifecycle 152, where the video game page template 158 includes content and actions received from the game developer system 180 and the third party system 190. In particular, the content and actions relevant to a phase of the video game lifecycle are added to sections of the video game page template 158, and these sections are organized according to the layout template that corresponds to the phase. When the phase of the video game 182 changes to a next phase of the video game lifecycle, the video game page template 158 is updated, where some of the sections are removed, remaining sections are edited, and new sections are added according to the layout template that corresponds to the next phase.

Upon a request of the user for information about the video game 182, the video game platform 150 can generate the video game page 122 from the video game page template 158 by customizing the content and/or actions of the video game template 158 according to the user context 156. For instance, if the user context 156 indicates that the user 112 has not acquired the video game 182 yet, the video game platform 150 selects the video game page template 158 corresponding to a pre-acquisition phase, adds information about the user to some of the content of the video game page template 158 and sends the customized video game template 158 as the video game page 122 to the video game console 110 for presentation within a GUI on the display 120. In comparison, if the user context 156 indicates that the user 112 has acquired and played the video game 182 and completed a particular achievement, the video game platform 150 selects the video game page template 158 corresponding to a post-acquisition phase, adds information about the particular achievement to the video game page template 158 and sends the customized video game template 158 as the video game page 122 to the video game console 110 for presentation within a GUI on the display 120.

In other words, given information about the video game 182 from the service provider, the game developer, and/or the third party, the video game platform 150 generates a video game page template 158 specific to a phase of the lifecycle of the video game 182. This template 158 includes all content and actions that are needed of the phase. Upon a change from the phase to another phase (where the change can depend on activities of the game developer, the third party, and/or the service provider and/or the user context 156 such as whether the user 112 acquired or not the video game 182), the video game platform 150 updates the video game page template 158 to become specific to the other phase. When a presentation to the user 112 is needed, the video game platform 150 accesses the latest user context 156 to customize the video game page template 158 and present it as the video game page 122.

In an example, generating the video game page template 158 and its customization into the video game page 122 are performed by a page application. The video game page template 158 can be used to bootstrap the page application and the video game page 122 may be the only interface to the page application. The page application can be executed on the video game platform 150 to implement the functionalities discussed herein above. However, the page application can be executed on the video game console 110 instead (in which case, various information and functionalities discussed herein above are local to the video game console 110), or distributed between the video game platform 150 and the video game console 110. The page application can be defined as program code that can be executed as a standalone application or as part of a system application or an operating system application.

In addition, the page application is usable to generate video game page templates and video game pages for different applications. The lifecycle definition and the layout templates can be common to the different applications, but the different applications can be at different lifecycle phases. Upon a request for information about a first video game, a first instance of the page application is executed and presents a first video game page specific to the first video game. Upon a request for information about a second video game, a second instance of the page application is executed and presents a second video game page specific to the second video game. However, from a user experience perspective, a similar user experience is provided regardless of the video game. For instance, similar look-and-feel and functionalities are provided to the user 112 in the two video game pages when the two video games are at the same lifecycle phase. The user experience is also seamless throughout the phases, where, for instance, the change to a video game page evolves intuitively for the user 112 from one lifecycle phase to the next one.

In an example, the video game platform 150 includes a set of computing resources, such as servers some or all of which may be virtualized and available from a computing cloud, that provides the functionalities described herein. The video game console 110 is an example of a suitable end user device. However, other end user devices can likewise be used, such as a mobile phone, a tablet, a laptop, a desktop computer, or other computing devices.

Figure 2:
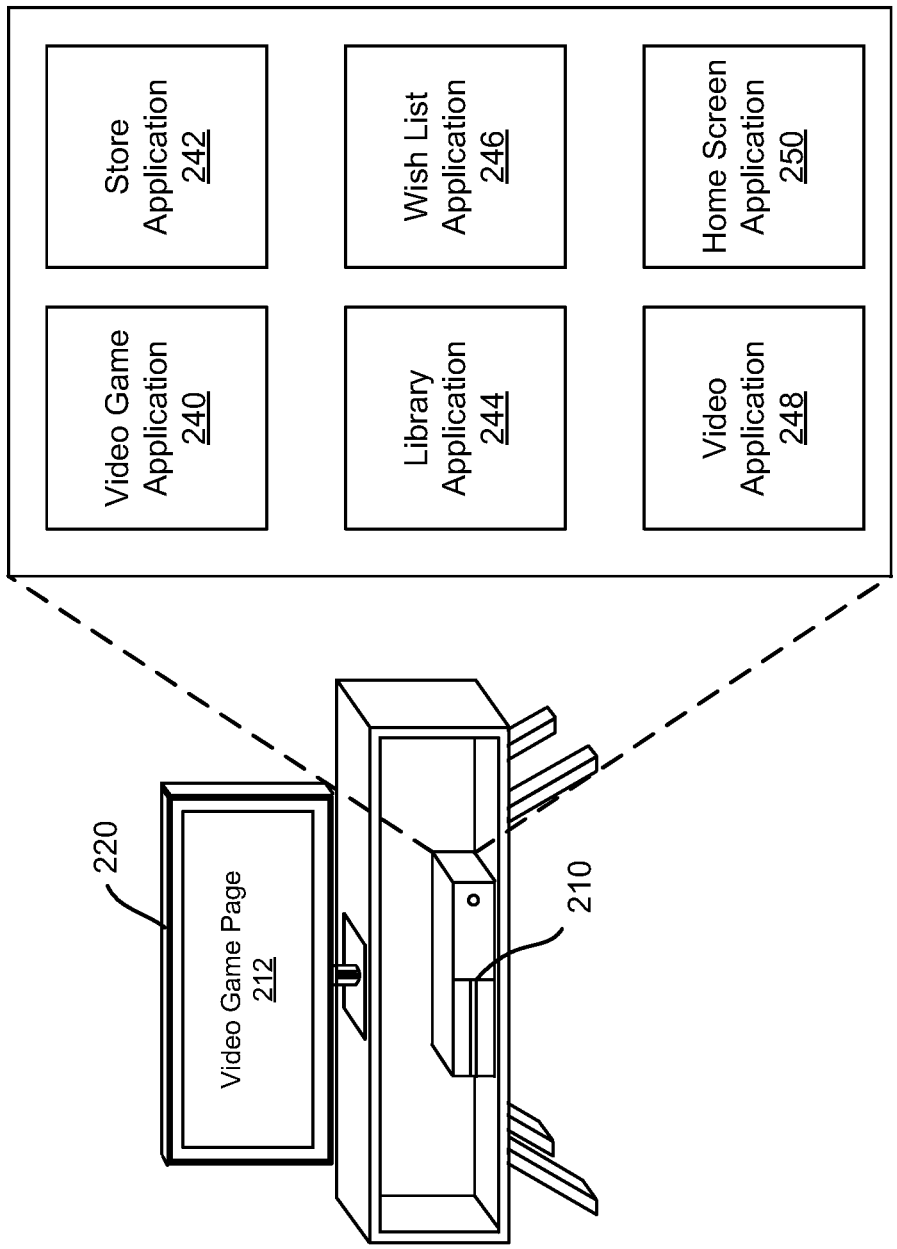
FIG. 2 illustrates a computer system that presents a video game page, according to an embodiment of the present disclosure.

FIG. 2 illustrates a computer system that presents a video game page, according to an embodiment of the present disclosure. As illustrated, the computer system includes a video game console 210 and a display 220. Although not shown, the computer system may also include a video game platform that is communicatively coupled with the video game console 210. The video game console 210 is communicatively coupled with a video game controller (not shown) and with the display 220 (e.g., over a communications bus). A user (e.g., a video game player) operates the video game controller to interact with the video game console 210. These interactions may include playing a video game presented on the display 220 and interacting with other applications of the video game console 210.

The video game console 210 includes a processor and a memory (e.g., a non-transitory computer-readable storage medium) storing computer-readable instructions that can be executed by the processor and that, upon execution by the processor, cause the video game console 210 to perform operations related to various applications. In particular, the computer-readable instructions can correspond to the various applications of the video game console 210 including a video game application 240, a store application 242, a library application 244, a wish list application 246, a video application 248, and a home screen application 250, among other applications of the video game console 210 (e.g., a home user interface (UI) application that facilitates a home page on the display 220). Each of such applications 240-250 can be defined as program code that can be executed as a standalone application or as part of a system application or an operating system application.

The video game controller is an example of an input device. Other types of the input device are possible including, a keyboard, a touchscreen, a touchpad, a mouse, an optical system, or other user devices suitable for receiving input of a user.

In an example, upon an execution of the video game application 240, a rendering process of the video game console 210 presents a video game page 212 in a window on a GUI of the display 220. The video game application 240 can generate the video game page 212 for a video game from a video game template based on a context of the user, where the video game template is based on a lifecycle of the video game. As described herein above, a video game application can instead be hosted on the video game platform (in which case, the video application 240 can be used to receive and present the video game page 212) or distributed between the video game platform and the video game console 210.

The store application 242 presents a page on the GUI about video games that may be available for acquisition, among other information. The library application 244 presents a page on the GUI about video games that have been acquired by the user, among other information. The wish list application 246 presents about video games that the user wishes to acquire, among other information. The video application 248 presents a page on the GUI about different video files that can be presented to the user, among other information. The home screen application 250 presents a page on the GUI about different functionalities of the video game console 210, including any of applications 240-248. A link to the video game page 212 can be embedded (e.g., as a linked icon or tile) in any of the applications 240-250. In other words, the video game page 212 can be requested and its presentation can be triggered upon a user selection of one of the links thereto.

Interactions of the user with the video game application 240 (e.g., to acquire the video game, to play the video game, etc.), and with the other applications 242-248 can be tracked. Information about such interactions are stored as part of a context of the user and this context can be used to generate the video game page 212.

Figure 3:
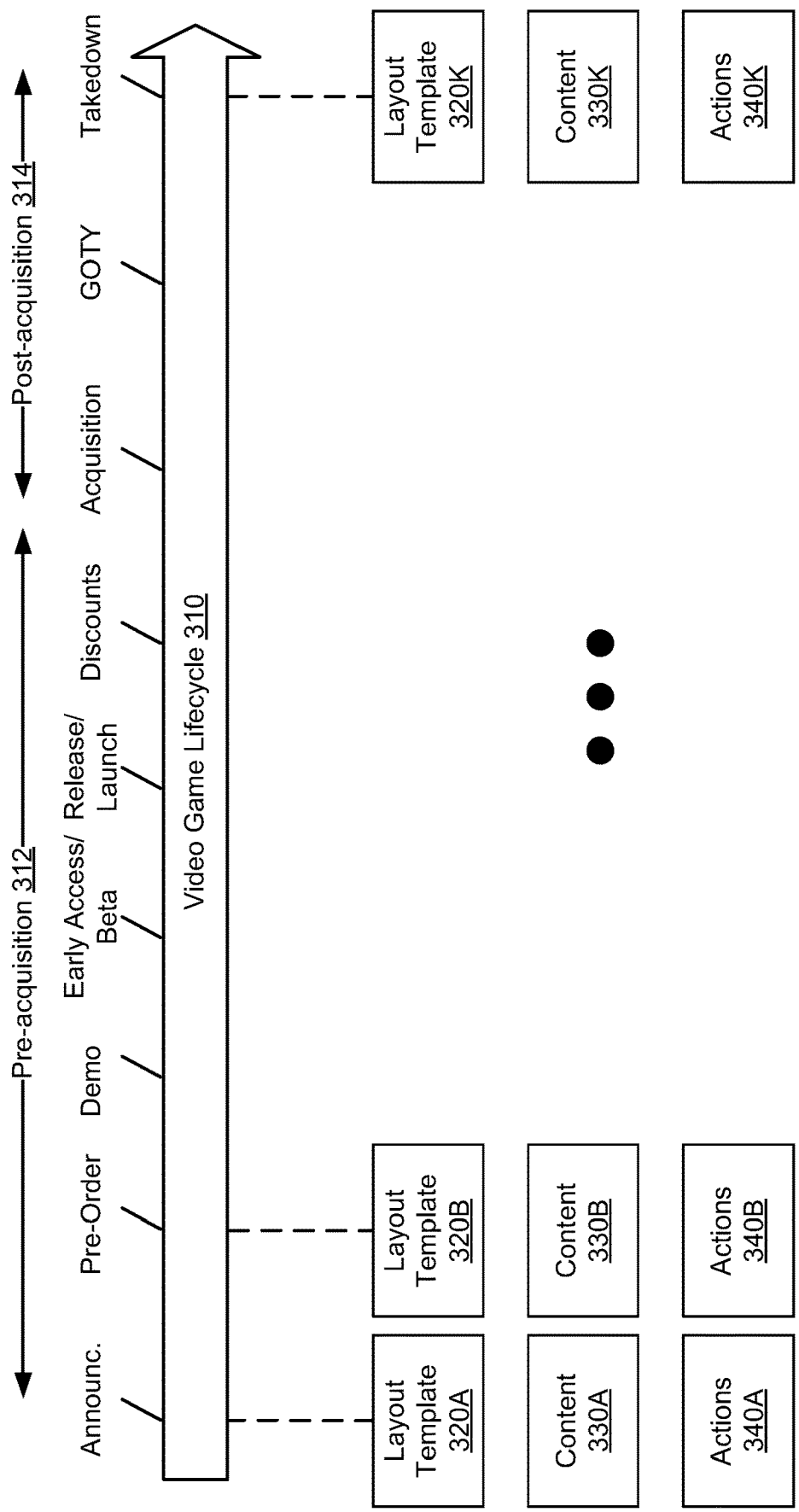
FIG. 3 illustrates an example of a video game lifecycle and associated elements for a video game page, according to an embodiment of the present disclosure.

FIG. 3 illustrates an example of a video game lifecycle 310 and associated elements for a video game page, according to an embodiment of the present disclosure. The elements include a layout template, content, and actions.

In an example, a service provider of a video game platform defines phases of the video game lifecycle 310. For instance, the video game platform provides a content pipeline to the service provider, where this pipeline may receive user input of the service provider and store this input as the definition of the phases. In the illustration of FIG. 3, this lifecycle 310 includes a pre-acquisition phase 312 and a post-acquisition phase 314. In turn, each of the phases can include a series of phases. For instance, the pre-acquisition phase 312 includes an announcement phase in which a game developer can announce that a new video game is being developed, a pre-order phase in which a user can order the new video game prior to completion of the development, a demonstration phase in which certain functionalities of the new video game can be demonstrated, an early access or beta phase in which a beta version of the new video game can be available, a release or launch phase in which the development is complete and the new video game is available for acquisition, and a discounts phase in which incentives may be available to acquire the new video game. In comparison, the post-acquisition phase 314 may include an acquisition phase in which a user may have acquired the new video game, a game of the year (GOTY) phase in which the new video game may have been nominated for an award, and a takedown phase in which the new video game (or the existing version) may be retired. The video game lifecycle 310 may be common to different video games.

The service provider may define a layout template for each of the phases. For instance, the content pipeline is also usable to the service provider to upload and/or define the layout and associate each of the layout templates with one or more phases. The layout template may be common to the different video games. An example layout template is further described in FIG. 4. Briefly, for a phase, the layout template specifies a set of sections to present in a video game page for a video game that is in the phase and specifies an arrangement of content, actions, and tiles (or windows that present some or all of the content and/or actions) within each section. The layout templates can be published on the video game platform such that video game developer can access and retrieve the layout templates.

The service provider, a video game developer, and/or a third party can define different content for a video game. Each content can be specific to a phase of the video game lifecycle 310. For instance, the content for the announcement phase can include a logo for the new video game, whereas the content for the release or launch phase can include renderings of the main characters of the new video game. In an example, the video game developer accesses the content pipeline via a game developer system to identify a video game (and upload any program code of the video game as applicable), select a phase, and upload the content specifically defined for the phase. The content pipeline may be usable to the service provider to change the phase of the video game and/or upload additional content. The content pipeline may also be usable to the third party to upload third party content and/or may automatically pull such third party content from a third party system.

The service provider, a video game developer, and/or a third party can define different actions for a video game. Each action can be specific to a phase of the video game lifecycle 310. For instance, the actions for the announcement phase can include adding the new video game to a wish list, whereas the acquisition phase can include a download action and a launch action. In an example, the content pipeline is also accessible to the service provider and/or the video game developer to define the actions and/or upload program codes executable to perform the actions. If the third party provides add-ons to the video game, the content pipeline can be accessible thereto to define the add-ons and/or any related actions.

As illustrated in FIG. 3, a layout template 320A, content 330A, and actions 340A are associated with the announcement phase based on the input of the service provider, game developer, and/or third party via the computing platform. The layout template 320A, the content 330A, and the actions 340A can be stored by the video game platform and used to generate a video game page template for the video game in association with the announcement phase. This video game page template can be generic to any user. Similarly, a layout template 320B, content 330B, and actions 340B are associated with the announcement phase based on the input of the service provider, game developer, and/or third party via the computing platform. Any of the layout template 320B, the content 330B, and the actions 340B may, but need not, be different from the layout template 320A, the content 330A, and the actions 340A. In addition, the video game page template generated for the announcement phase can be updated based on the layout template 320B, the content 330B, and the actions 340B such that it becomes applicable and specific to the pre-order phase. Of course, rather than updating the video game page template, another video game page template can be generated and stored in association with the pre-order phase. This process of associating layout templates, content, and actions with phases and updating the video game page template or generating additional video game page templates can be repeated for the different phases of the video game lifecycle 310 as illustrated with the three dots in FIG. 3, all the way to the last phase (e.g., the takedown phase). Here also, a layout template 320K, content 330K, and actions 340K are associated with the takedown phase and are defined such that the corresponding video game page template informs users that the video game lifecycle 310 has ended.

Although FIG. 3 illustrates specific phases, other variations are possible. For instance, the post-acquisition phase 314 can include any of a post-purchase phase (e.g., upon a user purchasing a video game), a post-download phase (e.g., after the user downloads the video game), a post-installation phase (e.g., after the video game is installed on the user's device), a post-play phase (e.g., after the user plays the video game for the first time), or a post-upgrade phase (e.g., after the user purchases, downloads, and installs an upgraded version of the video game).

Generally, in the post-acquisition phase 314, context of the user in the video game includes specific information about the user's interaction with, usage of, progress in, and playtime in the video game. Such specific information can be used to further customize the video game page for the user.

Although FIG. 3 shows that the video game lifecycle 310 is linear, the embodiments of the present disclosure are not limited as such. Instead, some of the phases may be parallel to each other. Further, some of the phases may overlap.

Furthermore, although FIG. 3 shows two specific phases (e.g., the pre-acquisition phase 314 and the post-acquisition phase 314), the embodiments of the present disclosure are not limited as such. In particular, a different number and other phases can be additionally or alternatively defined and used. Such phases can be in series or in parallel. Likewise, a different type or number of lifecycles can be additionally or alternatively defined and used. Such lifecycles can be in series or in parallel. Generally, a lifecycle of a video game includes a number of phases, in series and/or in parallel. A video game page template and a video game page can be generated and used for the lifecycle as described in the present disclosure. In an illustration, a user engagement lifecycle can be additionally or alternatively defined to include, for instance, awareness discovery, validation, purchase, play, engagement, retention, win back, and transition. A video game page template can be defined for each of these phases. Based on a context of a user, including which of the phases the user is associated with and, as applicable, a history of the user with a video game, a video game page can be generated and customized for the user from the relevant video game page template.

Figure 4:
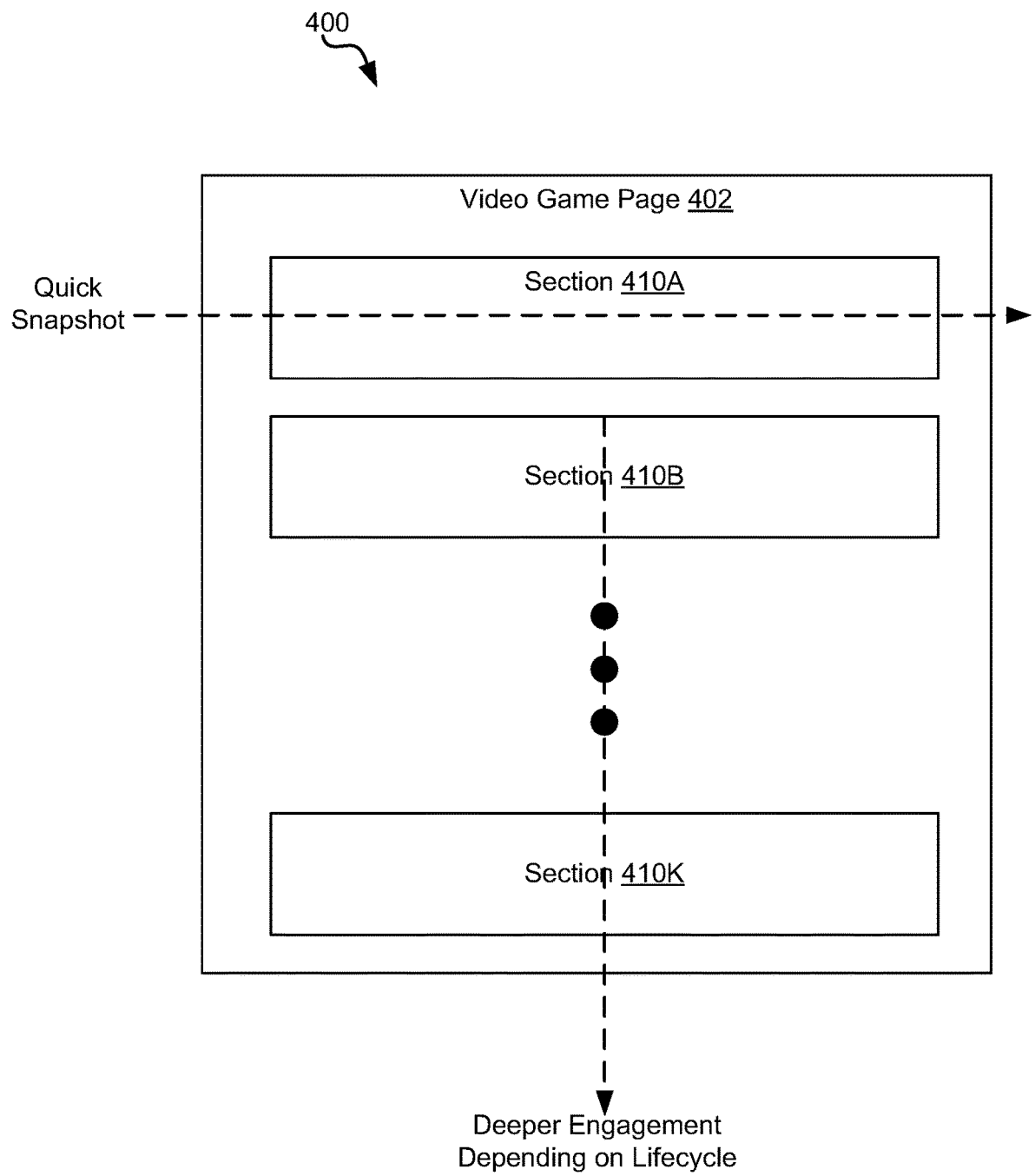
FIG. 4 illustrates an example of a layout of a video game page, according to embodiments of the present disclosure.

FIG. 4 illustrates an example of a layout 400 of a video game page 402, according to embodiments of the present disclosure. Generally, the video game page 402 includes multiple sections, illustrated as sections 410A, 410B, . . . , and 410K. Each of the sections includes a set of content and actions defined for a video game, as further illustrated in FIG. 5. The layout 400 defines an arrangement of the sections 410A-410K and, optionally, the arrangement of the content and actions within each section.

In an example, the layout 400 specifies that the top section to be presented in the video game page 402 (e.g., section 410A as illustrated in FIG. 4) should provide a quick snapshot about the phase of the video game's lifecycle and about the context of a user of the video game. As such, the section 410A is typically a cover section.

Furthermore, the layout 400 specifies that the remaining sections to be presented in the video game page 402 (sections 410B-410K as illustrated in FIG. 4) should provide deeper engagement to the user with the video game, where the engagement depends on the lifecycle phase. For instance, for a pre-acquisition phase, the engagement relates to informing the user about the video game and enticing the user to acquire the video game. In comparison, for a post-acquisition phase, the engagement relates to helping the user play the video game and improve their playing skills. Accordingly, and per the layout 400, the remaining sections 410B-410K need to be associated with the engagement. In addition, the remaining sections 410B-410K are arranged in an order of relevance, where the relevance corresponds to a ranking of how relevant each section is to the engagement. For instance, for a pre-acquisition phase, the section 410B can be a media section that presents a video trailer about the video game, and the section 410K can be a game details section that informs the user about the developer, release date, genre, and the like. For the pre-acquisition phase, the engagement is to inform and entice the user. Accordingly, the media section can be more relevant than the game details section and, hence, the section 410B would be arranged and presented in the video game page 402 ahead of the section 410K per the layout's 400 specification.

The layout 400 can further specify that the content and the actions within each section should be organized based on their relevancy to the lifecycle phase and the user context. For instance, in the cover page for a pre-acquisition phase, two actions can be included: one for a selectable acquisition button and one for a selectable wish list addition button. Given the user context, the acquisition button may be more relevant to the user. Per the layout's 400 specifications, in this case, the acquisition button would be shown first or more prominently displayed than the wish list addition button.

Figure 5:
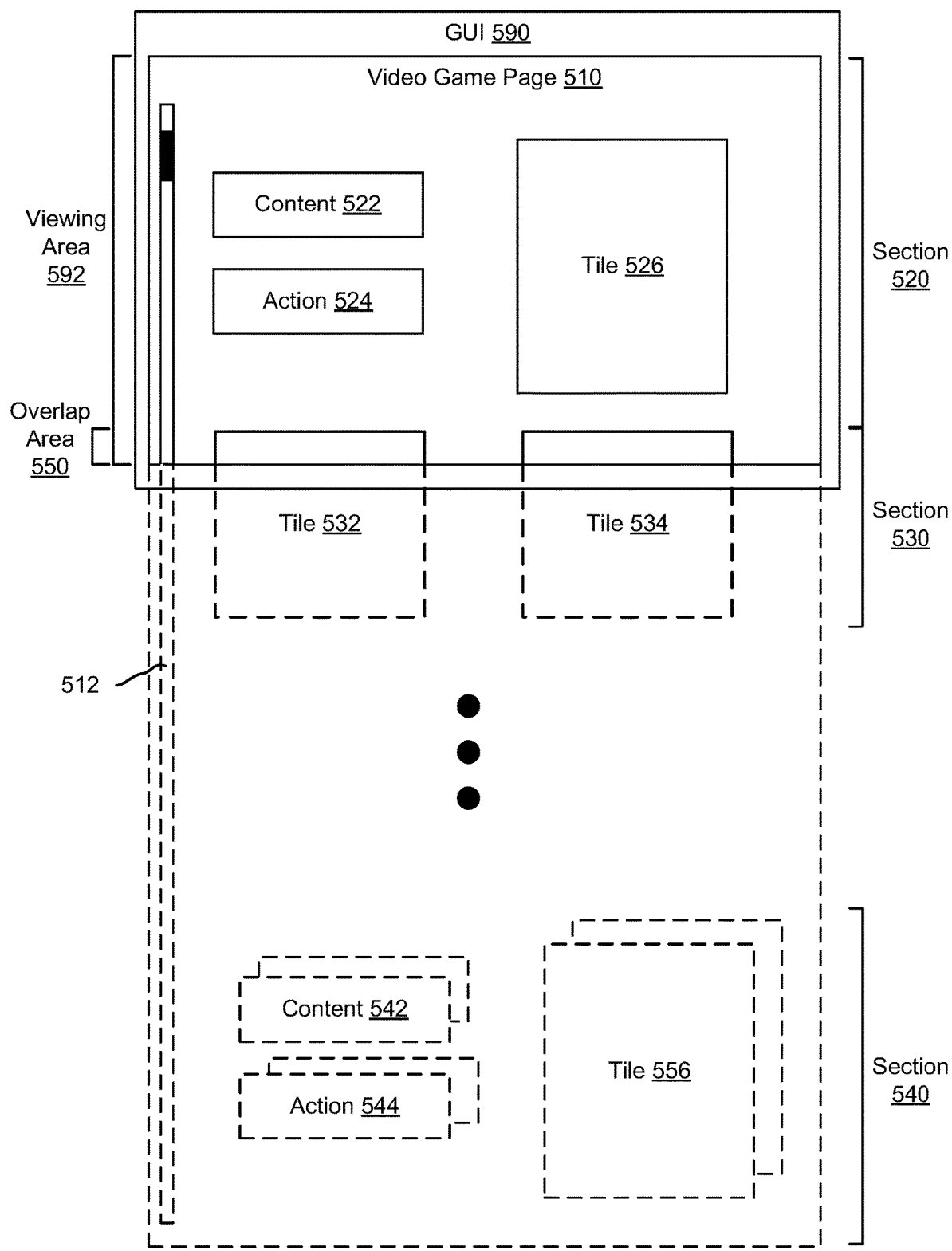
FIG. 5 illustrates an example of a video game page as presented on a GUI, according to embodiments of the present disclosure.

FIG. 5 illustrates an example of a video game page 510 as presented on a GUI 590, according to embodiments of the present disclosure. The GUI 590 includes a viewing area 592, such as a presentation area that can be viewed by a user. The video game page 510 has a presentation area that is larger than the viewing area 592. Accordingly, the video game page 510 can be organized to be scrollable as indicated with a scroll bar 512.

In an example, the video game page 510 includes a plurality of sections, such as a section 520, a section 530, and a section 540. These sections are scrollable and the size of each section (e.g., width and height) is smaller than the viewing area 592 of the GUI 590. In this way, a section can be presented fully in the viewing area 592. The layout of the video game page 510 can specify the size and arrangement of the sections.

In addition, to provide visibility to the user about the next scrollable section, the top of the next scrollable section can be simultaneously shown at the bottom of the viewing area 592 (and/or, conversely, the bottom of the previous scrollable section can be simultaneously shown at the top of the viewing area 592). FIG. 5 illustrates this presentation of the scrollable sections by identifying an overlap area 550 at the bottom of the viewing area 592. The section 512 is fully shown in the viewing area 592 and, simultaneously, the top of the next scrollable section 530 is shown in the overlap area 550. The layout of the video game page 510 can specify the size and of the overlap area 550.

Each of the sections includes content and actions. Tiles can also be used to present some of the content and/or actions. A tile is generally a window that has a predefined size per the layout. Content and/or actions presented in the tile can be dynamic and interactive. The arrangement of content, actions and tiles, including their numbers, sizes, and separation can be specified by the layout.

As illustrated in FIG. 5, the section 520 includes content 522, action 524, and tile 526. For instance, content 522 can identify a title of the video game. Action 524 can be a selectable button that triggers a process to be performed by the video game console and/or video game platform in association with the video game (e.g., downloading the video game, adding the title to a wish list, launching the video game, etc.). The tile 526 can show, for instance, achievements of the user playing the video game.

Similarly, the section 530 includes tiles 532 and 534. In turn, the tiles 532 and 534 include content and/or actions that are not found in any of the other sections of the video game page 510. The section 540 also includes a plurality of content 542, a plurality of actions 544, and a plurality of tiles 556.

The next figures illustrate different sections of a video game page in different lifecycle phases. FIGS. 6-10 illustrate scrollable sections through a pre-acquisition phase where a video game was announced, but has not been launched yet. FIGS. 11-17 illustrate scrollable sections through a pre-acquisition phase where the video game has launched. FIGS. 18-21 illustrate scrollable sections through a post-acquisition phase.

Figure 6:
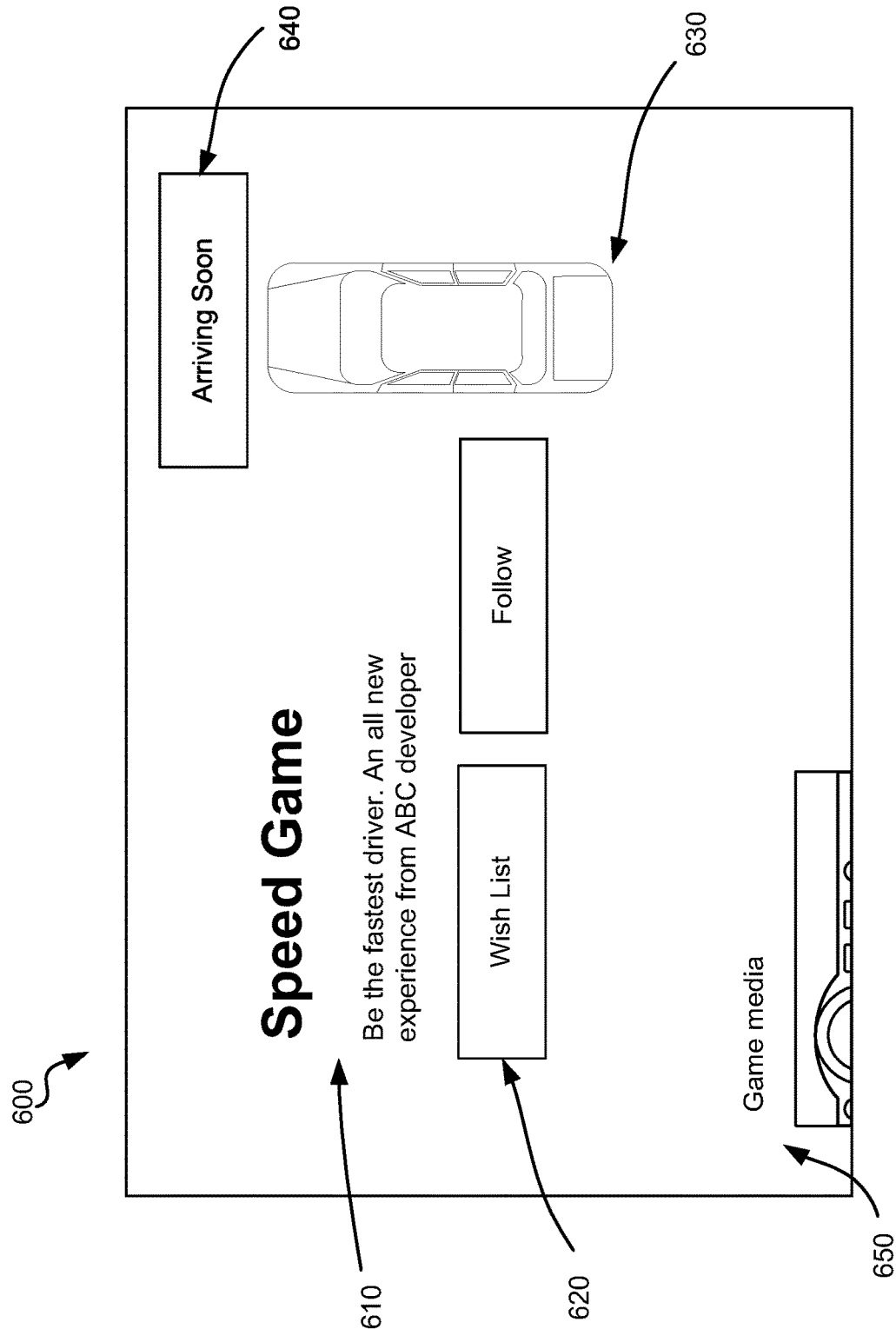
FIG. 6 illustrates an example of a first section of a video game page in a first phase of a video game lifecycle, according to embodiments of the present disclosure.

FIG. 6 illustrates an example of a first section of a video game page 600 in a first phase of a video game lifecycle, according to embodiments of the present disclosure. Here, the first phase is an announcement phase and the first section is a cover section. In the cover section, a short description 610 of the video game is presented (e.g., game title, the developer). Given that the user has not acquired the video game, the short description 610 includes an invitation to do so (e.g., "be the fastest driver" as shown in FIG. 6). The cover section also includes action buttons 620. Given that the video game has not been released yet (but has been announced) and that the user context indicates that the user has not added the video game yet to a wish list, the action buttons 620 include a wish list button and a follow button. In addition, the cover section shows a cover art 630 of the video game (e.g., a logo). The cover section further informs the user of an upcoming release date or includes a coming soon notice 640. At the bottom of the GUI, the top of the next scrollable section 650 is shown (as illustrated, this section 650 is a game media section).

Generally, the cover section contains a full bleed concept level cover art, game concept name, concept level tagline, estimated publishing date or coming soon notice, publisher name, compatibility notices if available, and calls for actions. The content herein (e.g., the cover art, the game title, etc.) be uploaded via the content pipeline.

The cover section is immersive by including full bleed cover art that draws users into the game world, setting the mood for the rest of the game research journey. The cover section is also informative by including tagline descriptions that offer the chance to pitch the users on the new game concept in one or two impactful sentences. The cover section is also actionable allowing the users to add a game concept to their wish list to receive a notification when a product is purchasable, and/or follow a game concept to receive news about the video game.

Figure 7:
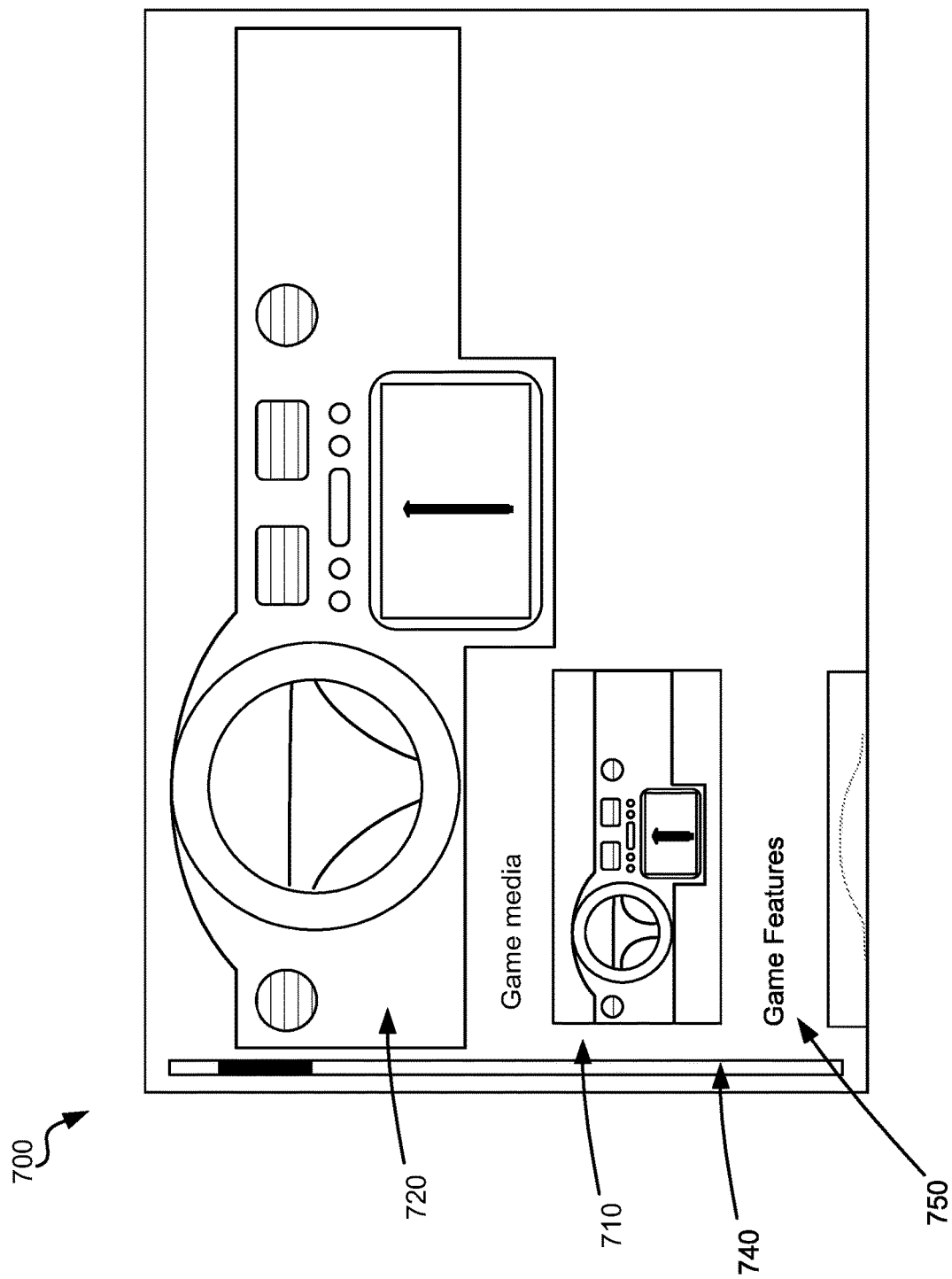
FIG. 7 illustrates an example of a second section of a video game page in a first phase of a video game lifecycle, according to embodiments of the present disclosure.

FIG. 7 illustrates an example of a second section of a video game page 700 in a first phase of a video game lifecycle, according to embodiments of the present disclosure. Here, the first phase is an announcement phase and the second section is a media section. The media section includes one or more tiles 710, each embedding a link to a video file about the video game. An included tile shows a frame of the video file. A background 720 of the media section is set to the frame. In other words, the background 720 is an image that corresponds to the frame. The media section is scrollable, as illustrated with a scroll bar 740 and, at the bottom of the GUI, the top of the next scrollable section 750 is shown (as illustrated, this section 750 is a game features section).

Generally, the media section provides videos and screenshot strands where users can discover trailers, gameplay videos and screenshots from the video game. Screenshots and videos may, but need not, be uploaded via the content pipeline.

The media section is accessible, where game media strands are positioned directly below the cover section and, thus, their position is the most intuitive next content exploration after landing on the cover section. The media section is also intuitive, where video content can play automatically without sound when a preview tile is in focus, thereby enabling a purely visual browsing experience that is non-intrusive. Users can press a button to play the videos in full screen to enjoy a fully immersive multimedia experience with sound.

Figure 8:
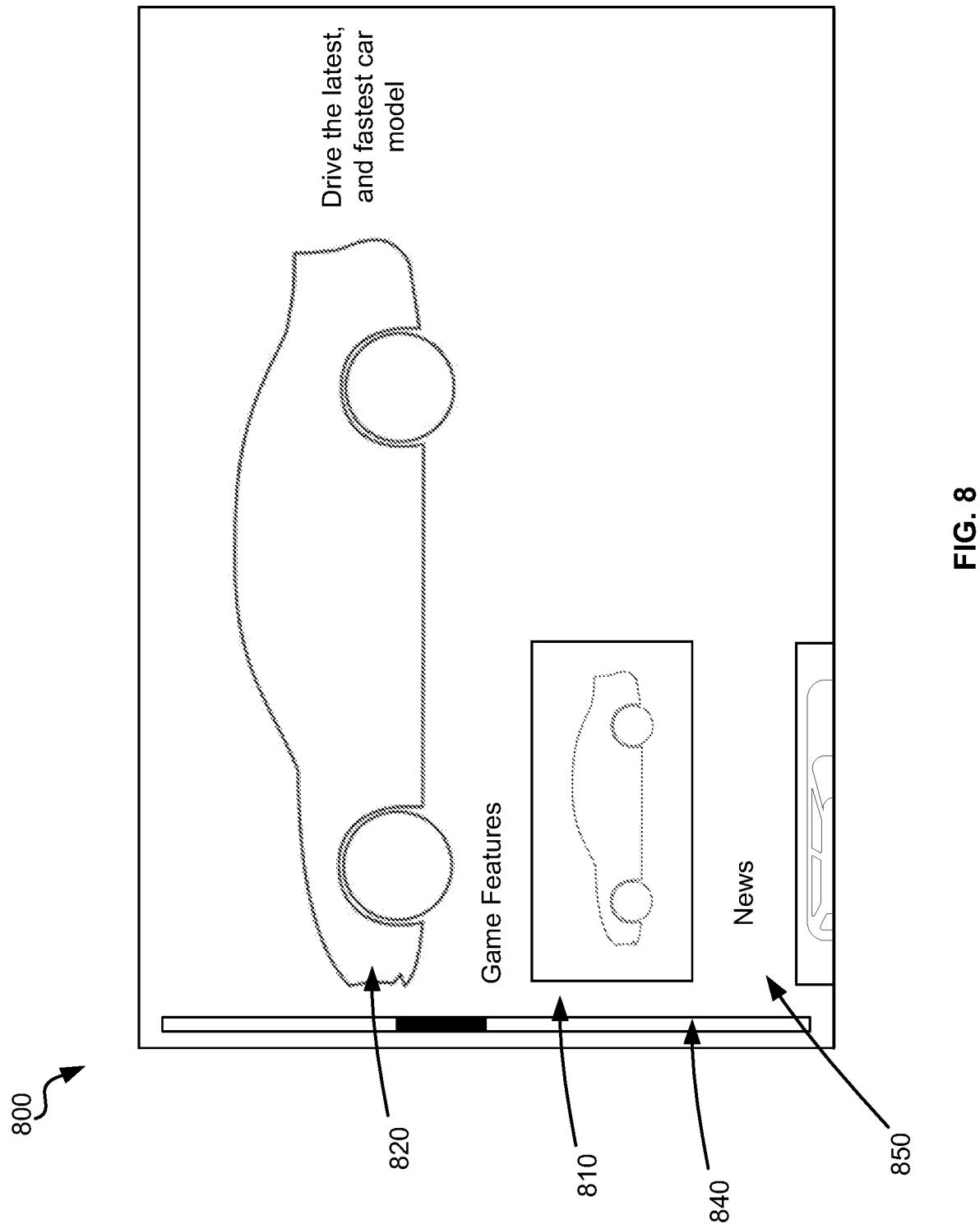
FIG. 8 illustrates an example of a third section of a video game page in a first phase of a video game lifecycle, according to embodiments of the present disclosure.

FIG. 8 illustrates an example of a third section of a video game page 800 in a first phase of a video game lifecycle, according to embodiments of the present disclosure. Here, the first phase is an announcement phase and the third section is a game features section. The game features section includes one or more tiles 810, each embedding a link to a video file about one or more features of the video game. An included tile shows a frame of the video file. A background 820 of the media section is set to the frame and includes a short description of a feature of the video game. The game features section is scrollable, as illustrated with a scroll bar 840 and, at the bottom of the GUI, the top of the next scrollable section 850 is shown (as illustrated, this section 850 is a news section).

Generally, the game features section allows developers to introduce the features included in the video game by uploading multiple game feature stories via the content pipeline.

The game features section is customizable where the developers can choose between a number of layout templates, or decide to use a custom layout unique to their needs. Each game feature supports a header (optional), a body paragraph copy (optional), either a video or an image, a preview tile title, and a layout (optional).

Figure 9:
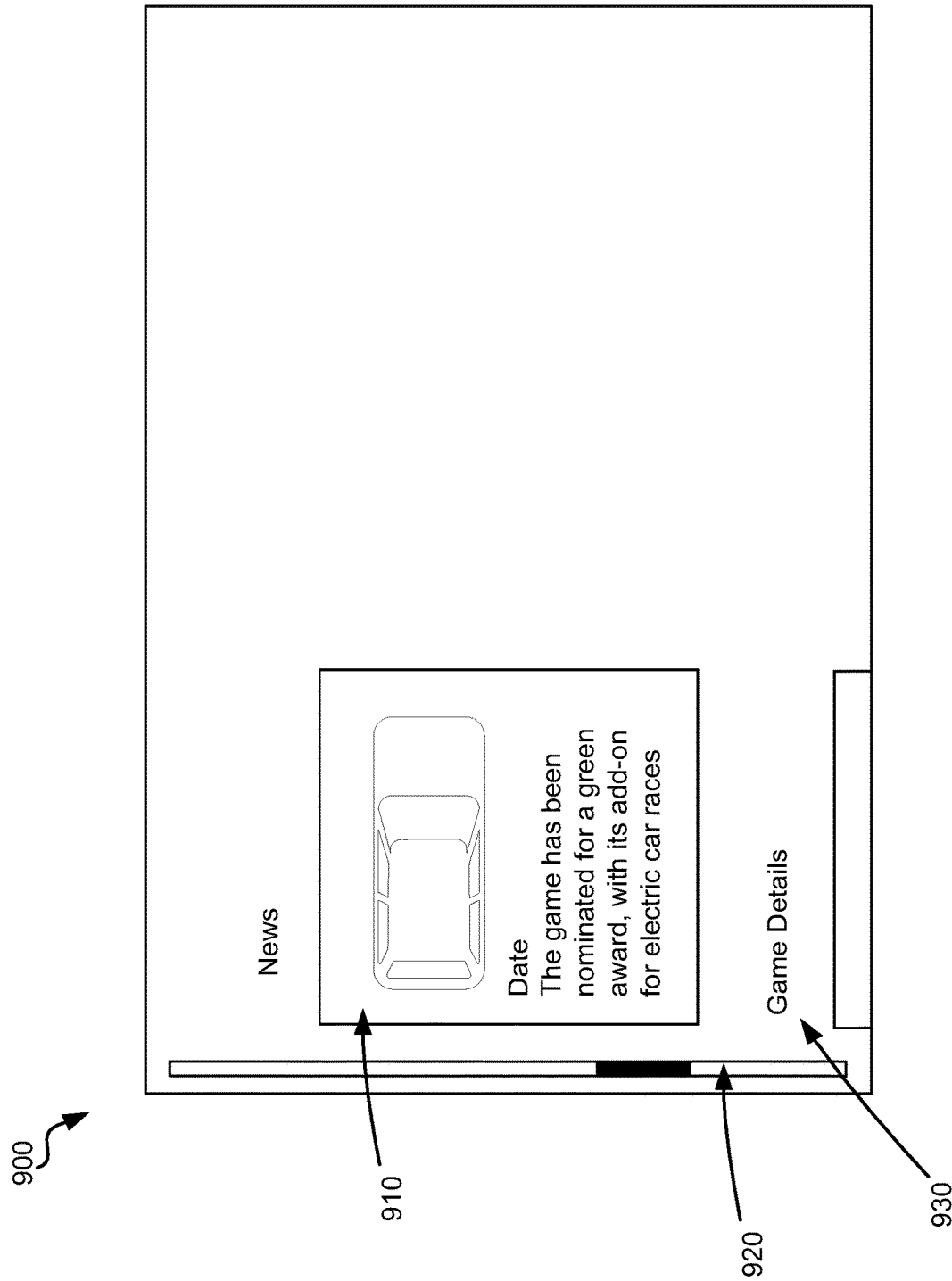
FIG. 9 illustrates an example of a fourth section of a video game page in a first phase of a video game lifecycle, according to embodiments of the present disclosure.

FIG. 9 illustrates an example of a fourth section of a video game page 900 in a first phase of a video game lifecycle, according to embodiments of the present disclosure. Here, the first phase is an announcement phase and the fourth section is a news section. The news section includes one or more tiles 910, each embedding a link to a news feed (e.g., text article, audio file, and/or video file) about the video game. An included tile shows covert art and a new synopsis. The news section is scrollable, as illustrated with a scroll bar 920 and, at the bottom of the GUI, the top of the next scrollable section 930 is shown (as illustrated, this section 930 is a game details section).

Generally, developers can submit news stories in association with a lifecycle phase, and these new stories are presented in the news section. News content such as upcoming events, or behind the scenes stories can help build user excitement towards a new game, which may lead to a higher conversion rate.

Figure 10:
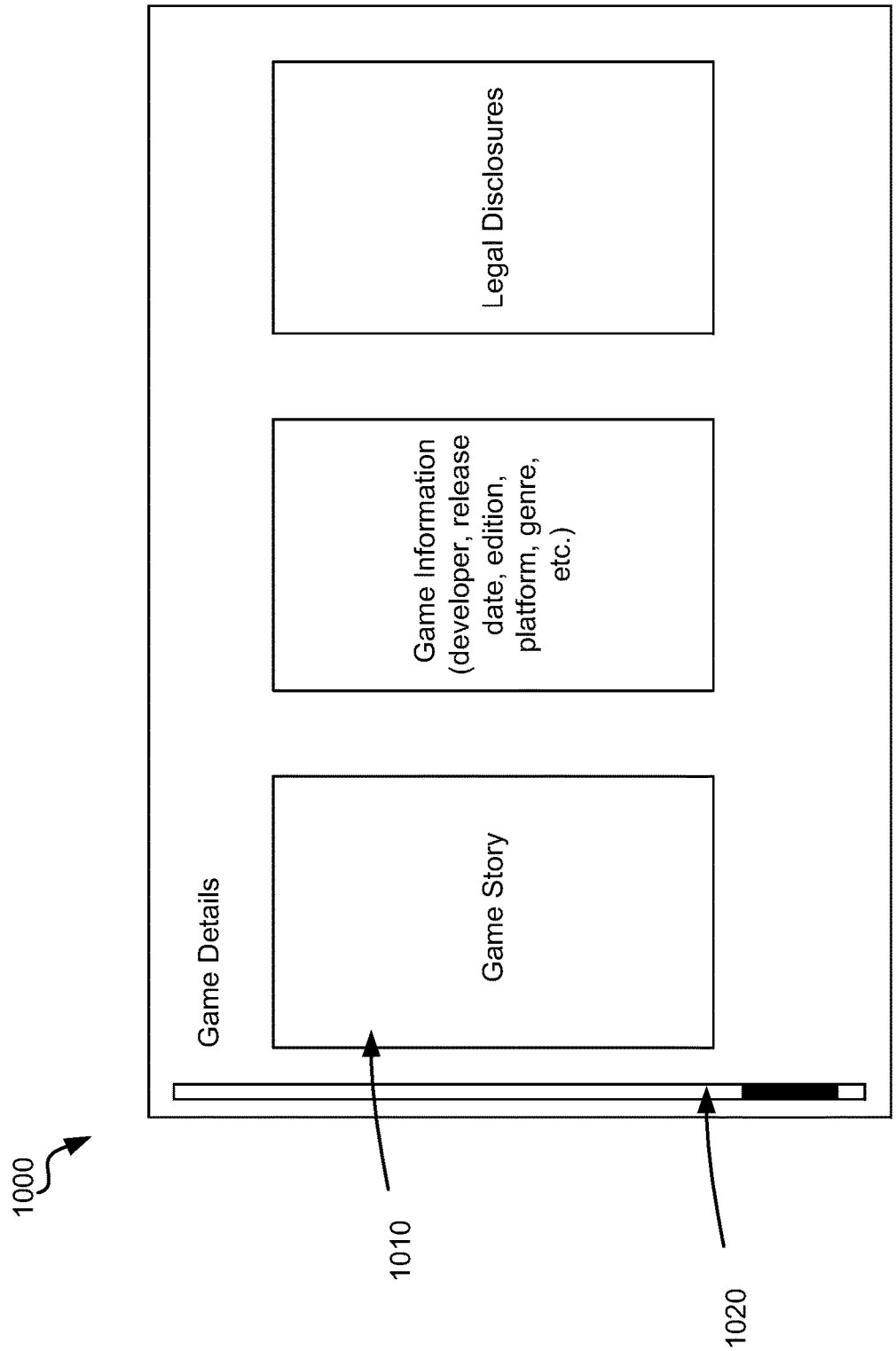
FIG. 10 illustrates an example of a fifth section of a video game page in a first phase of a video game lifecycle, according to embodiments of the present disclosure.

FIG. 10 illustrates an example of a fifth section of a video game page 1000 in a first phase of a video game lifecycle, according to embodiments of the present disclosure. Here, the first phase is an announcement phase and the fifth section is a game details section. The game details section includes one or more tiles 1010, each embedding a link to a details page about the video game, such as a game story, game information (developer, release, date, edition, platform, genre, etc.) and legal disclosure. The game features section is scrollable, as illustrated with a scroll bar 1020.

Generally, the game details section is a programmatically generated section with detailed game information powered by the content pipeline. Some of the content received via the content pipeline includes marketing text, genre, developer display name, display release date, legal copy including copyright information and account membership requirements, and compatibility notices.

Figure 11:
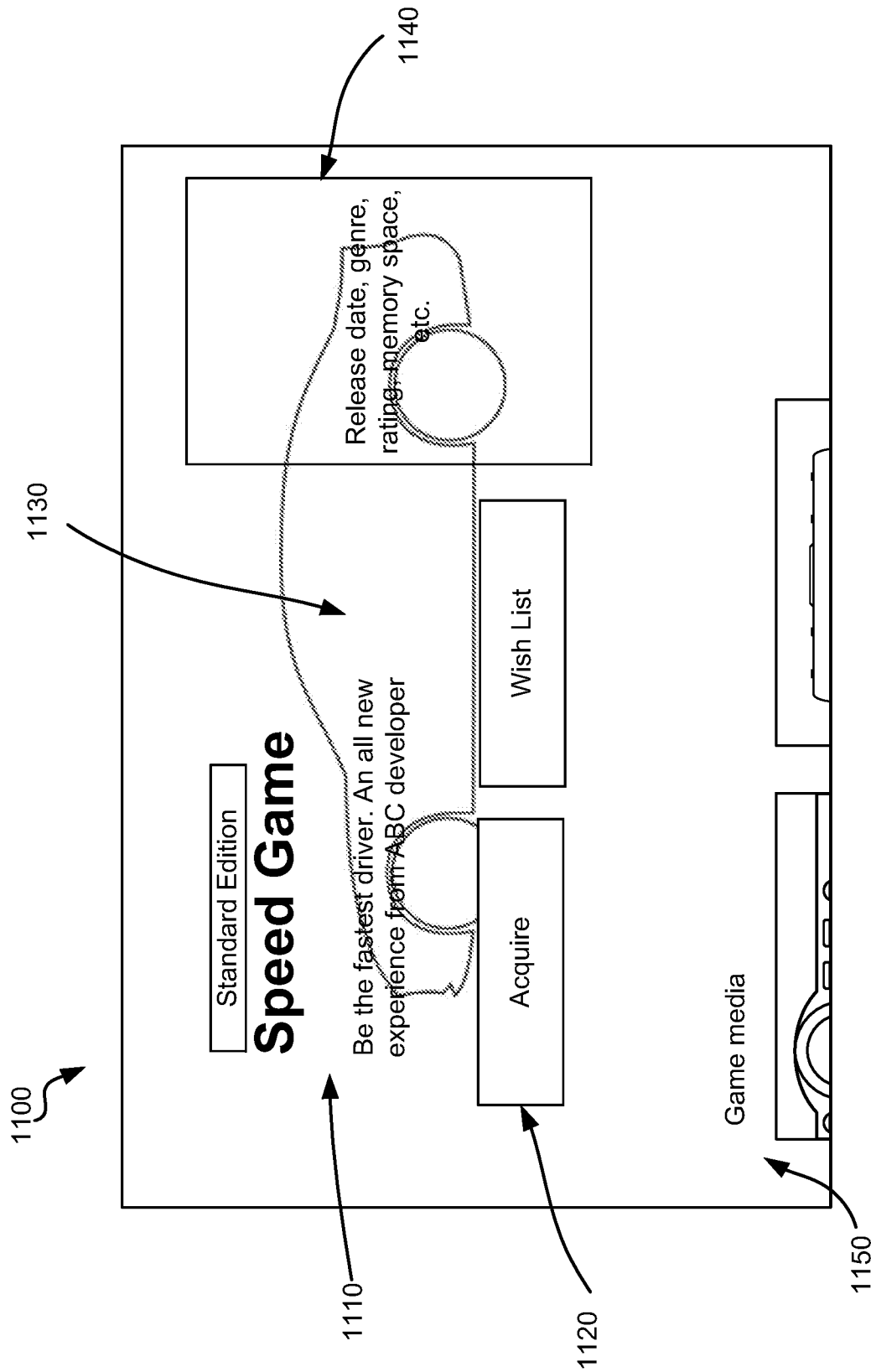
FIG. 11 illustrates an example of a first section of a video game page in a second phase of a video game lifecycle, according to embodiments of the present disclosure.

FIG. 11 illustrates an example of a first section of a video game page 1100 in a second phase of a video game lifecycle, according to embodiments of the present disclosure. Here, the second phase is a release phase and the first section is a cover section. The cover section is generally similar to the cover section of FIG. 6, except here the cover section includes additional information about the video game, such as its release date, its genre, its rating, needed memory space, etc. In the cover section of FIG. 11, a short description 1110 of the video game is presented (e.g., game title, the developer, an edition of the video game). Given that the user has not acquired the video game, the short description 1110 includes an invitation to do so (e.g., "be the fastest driver" as shown in FIG. 11). The cover section also includes action buttons 1120. Given that the video game was released and that the user context indicates that the user has not added the video game yet to a wish list, the action buttons 1120 include an acquire button and a wish list button. In addition, the cover section shows a cover art 1130 of the video game (e.g., an actual tool—the car in FIG. 11—from the video game). The cover section further informs the user about the game information as shown in a tile 1140. At the bottom of the GUI, the top of the next scrollable section 1150 is shown (as illustrated, this section 1150 is a game media section).

Generally, the cover section contains a full bleed cover art, game concept name, product edition name, tagline, price, friends who play, publishing date, publisher name, compatibility notices, age ratings, calls for actions. All content excluding friends who play and the calls for actions are typically uploaded via the content pipeline.

The cover section is immersive by including full bleed cover art that draws users into the game world, setting the mood for the rest of the game research journey. The cover section is also informative by including tagline descriptions that offer the chance to pitch users on the video game in one or two impactful sentences. Pricing and sales countdown timer can be shown (e.g., in tile 1140) and are dynamically adjusted based on the calls for actions being in focus, reducing users' mental workload while maximizing the exposure of upsell benefits. A friends who play summary takes full advantage of the power of social proof and the thriving video game platform community during the game evaluation process. The cover section also identifies the release date and developer and includes compatibility notices and age ratings to inform users about required software and hardware to play the game as well as the rating board information necessary to determine content appropriateness. The cover section is also actionable by including a smart display of call to actions depending on the game lifecycle, purchase options, users' eligibility for certain rewards etc. Examples of calls for actions include pre-order, add to cart, download, stream, Save with a platform service, join a platform group, add to library, etc.

Figure 12:
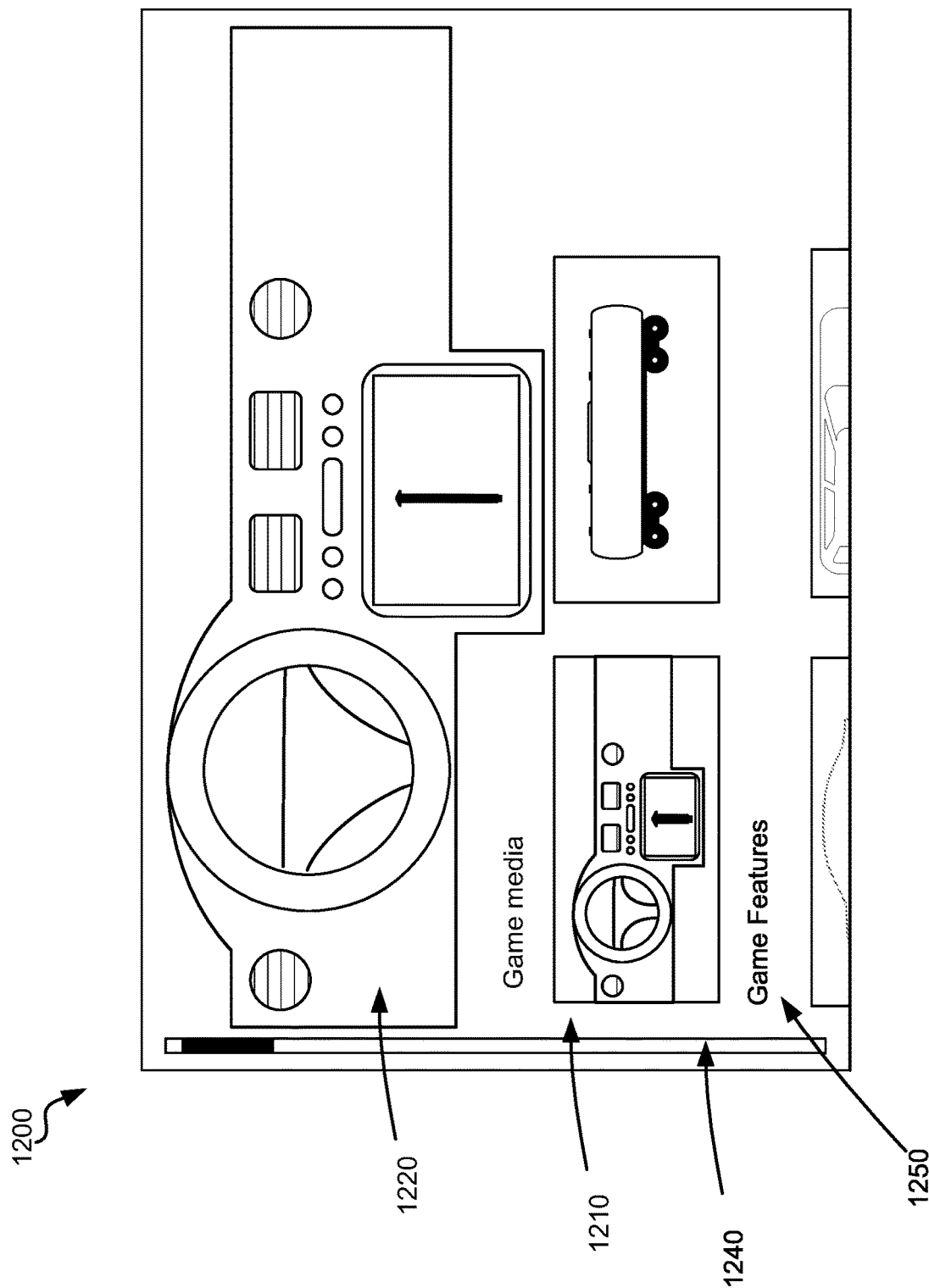
FIG. 12 illustrates an example of a second section of a video game page in a second phase of a video game lifecycle, according to embodiments of the present disclosure.

FIG. 12 illustrates an example of a second section of a video game page 1200 in a second phase of a video game lifecycle, according to embodiments of the present disclosure. Here, the second phase is a release phase and the second section is a media section. The media section is generally similar to the media section of FIG. 7, except additional media files may be available. As illustrated in FIG. 12, the media section includes a plurality of tiles 1210, each embedding a link to a video file about the video game. An included tile shows a frame of the video file. A background 1220 of the media section is set to the frame at least when the included file is in focus. The media section is scrollable, as illustrated with a scroll bar 1240 and, at the bottom of the GUI, the top of the next scrollable section 1250 is shown (as illustrated, this section 1250 is a game features section).

Generally, the media section provides videos and screenshot strands where users can discover trailers, gameplay videos and screenshots from the video game. Screenshots and videos may, but need not, be uploaded via the content pipeline.

The media section is accessible, where game media strands are positioned directly below the cover section and, thus, their position is the most intuitive next content exploration after landing on the cover section. The media section is also intuitive, where video content can play automatically without sound when a preview tile is in focus, thereby enabling a purely visual browsing experience that is non-intrusive. Users can press a button to play the videos in full screen to enjoy a fully immersive multimedia experience with sound.

Figure 13:
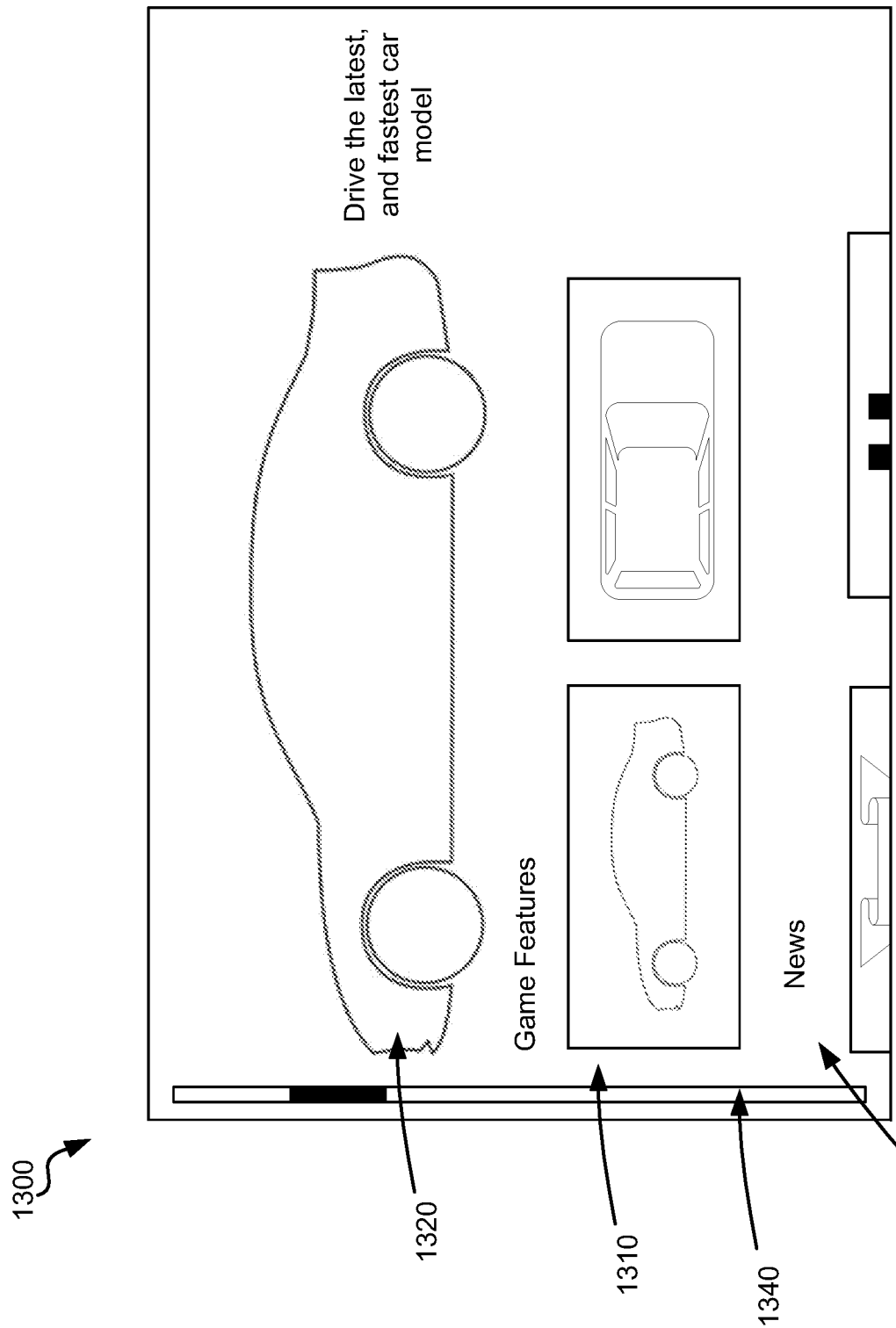
FIG. 13 illustrates an example of a third section of a video game page in a second phase of a video game lifecycle, according to embodiments of the present disclosure.

FIG. 13 illustrates an example of a third section of a video game page 1300 in a second phase of a video game lifecycle, according to embodiments of the present disclosure. Here, the second phase is a release phase and the third section is a game features section. The game features section is generally similar to the game features section of FIG. 8, except additional media files may be available. As illustrated in FIG. 13, the game features section includes a plurality of tiles 1310, each embedding a link to a video file about one or more features of the video game. An included tile shows a frame of the video file. A background 1320 of the media section is set to the frame and includes a short description of a feature of the video game, at least when the included tile is in focus. The game features section is scrollable, as illustrated with a scroll bar 1340 and, at the bottom of the GUI, the top of the next scrollable section 1350 is shown (as illustrated, this section 150 is a news section).

Generally, the game features section allows developers to introduce the features included in the video game by uploading multiple game feature stories via the content pipeline. Concept level stories can be copied over to the video game level if the assets and metadata are still relevant for a given video game.

The game features section is customizable where the developers can choose between a number of layout templates, or decide to use a custom layout unique to their needs. Each game feature supports a header (optional), a body paragraph copy (optional), either a video or an image, a preview tile title, and a layout (optional).

Figure 14:
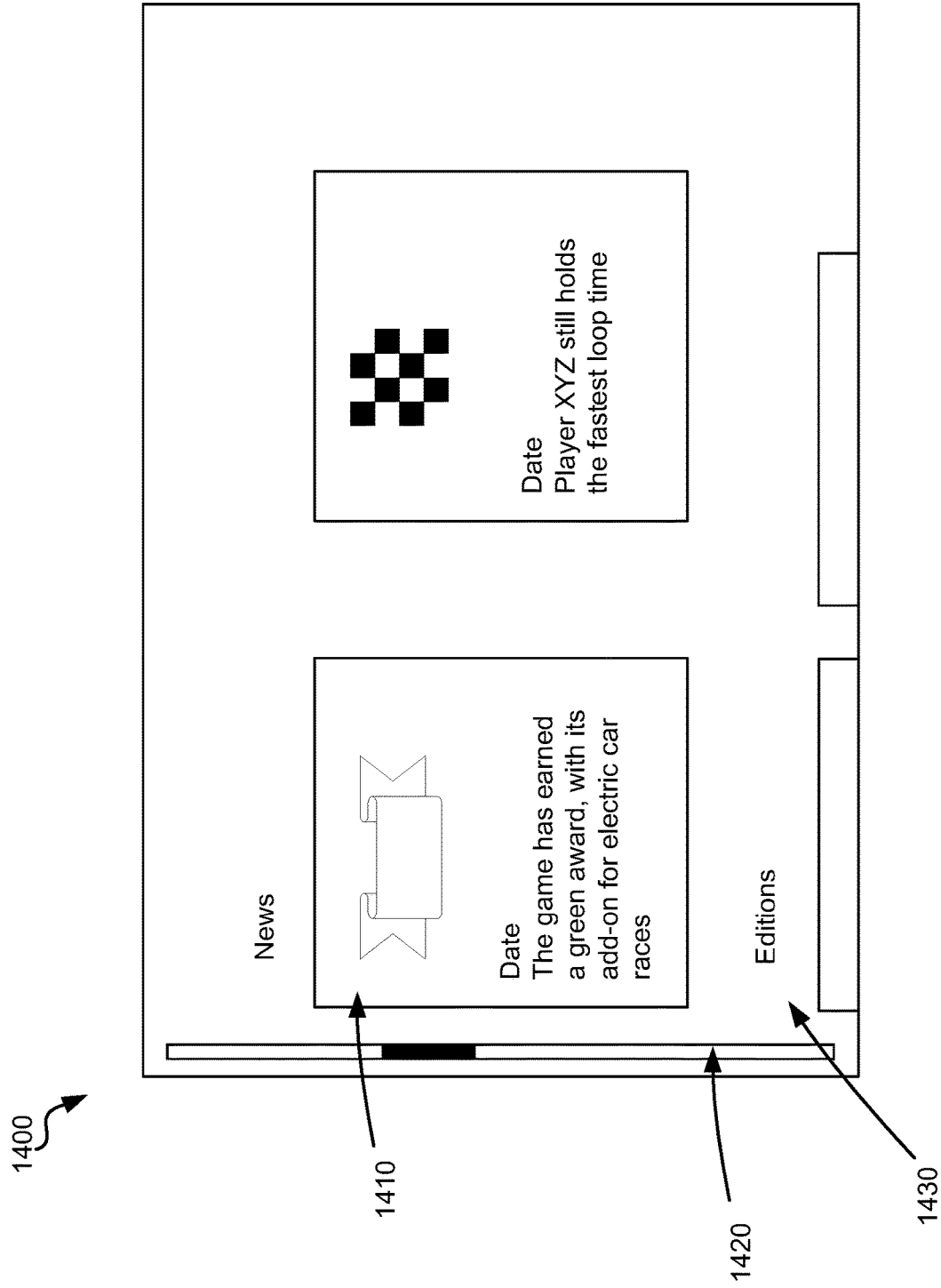
FIG. 14 illustrates an example of a fourth section of a video game page in a second phase of a video game lifecycle, according to embodiments of the present disclosure.

FIG. 14 illustrates an example of a fourth section of a video game 1400 page in a second phase of a video game lifecycle, according to embodiments of the present disclosure. Here, the second phase is a release phase and the fourth section is a news section. The news section is generally similar to the news section of FIG. 9, except additional news feeds may be available. As illustrated in FIG. 14, the news section includes a plurality of tiles 1410, each embedding a link to a news feed (e.g., text article, audio file, and/or video file) about the video game. An included tile shows covert art and a new synopsis. The news section is scrollable, as illustrated with a scroll bar 1420 and, at the bottom of the GUI, the top of the next scrollable section 1430 is shown (as illustrated, this section 1430 is an editions section).

Generally, developers can submit news stories in association with a lifecycle phase, and these new stories are presented in the news section. News content such as upcoming events, or behind the scenes stories can help build user excitement towards a new game, which may lead to higher conversion rate. News stories can exist at the game concept level, which means each video game under the same concept can have the same news strand.

Figure 15:
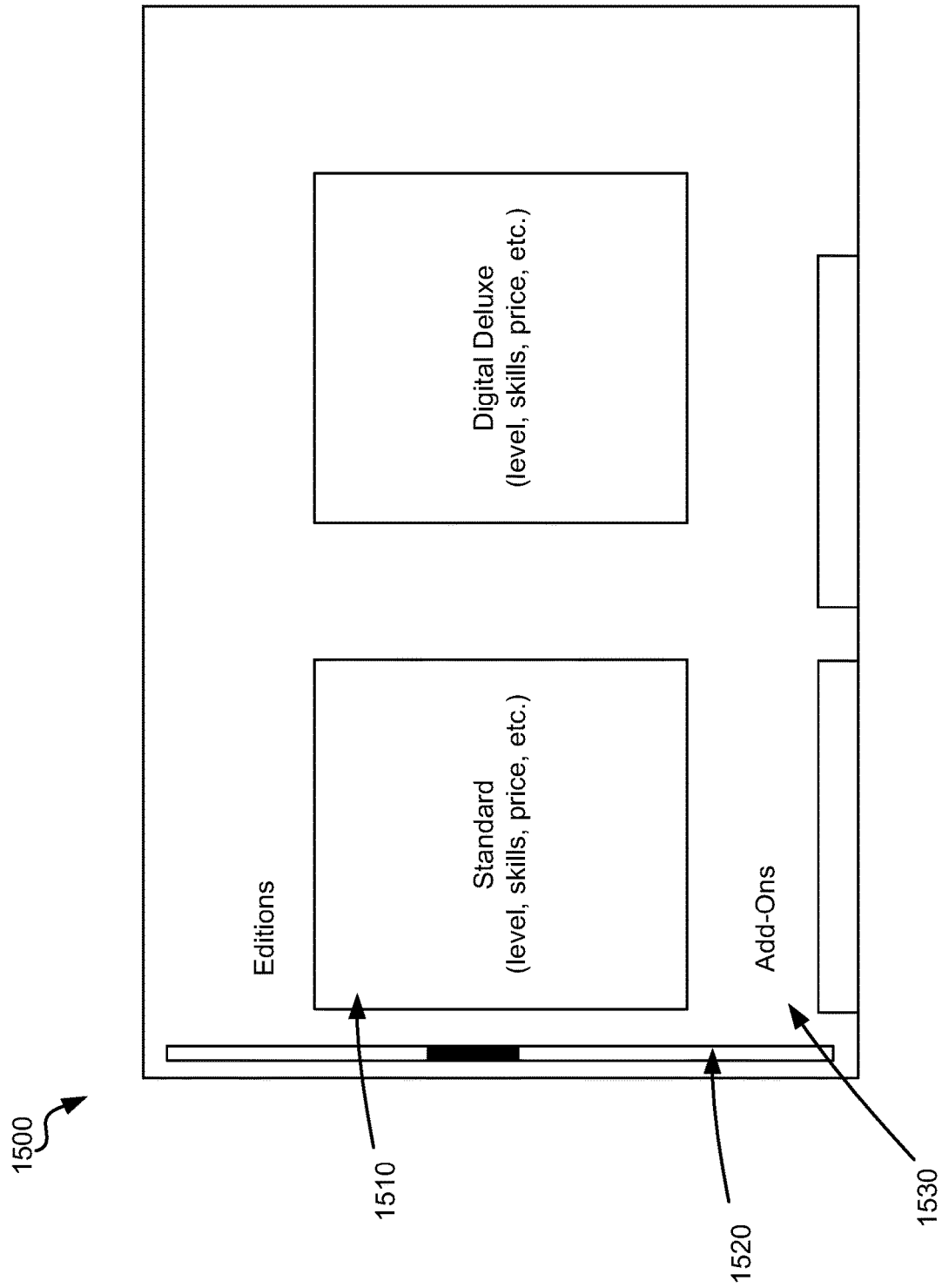
FIG. 15 illustrates an example of a fifth section of a video game page in a second phase of a video game lifecycle, according to embodiments of the present disclosure.

FIG. 15 illustrates an example of a fifth section of a video game page 1500 in a second phase of a video game lifecycle, according to embodiments of the present disclosure. Here, the second phase is a release phase and the fifth section is an editions section. The editions section includes a plurality of tiles 1510, each presenting information about an edition of the video game (e.g., a standard edition, a digital deluxe edition, etc.). The editions section is scrollable, as illustrated with a scroll bar 1520 and, at the bottom of the GUI, the top of the next scrollable section 1530 is shown (as illustrated, this section 1530 is an add-ons section).

Generally, the editions section is a programmatically generated strand of full game editions and bundles. The editions section allows users to quickly glance across the features and content available in each edition bundle, so they could be enticed to acquire a premium version of the game. The following metadata and assets can be used to populate the editions section: version key art, edition name, edition upsell feature list (per edition/bundle), and pricing. The assets and metadata for each game edition/bundle product may, but need not, be submitted through the content pipeline.

Figure 16:
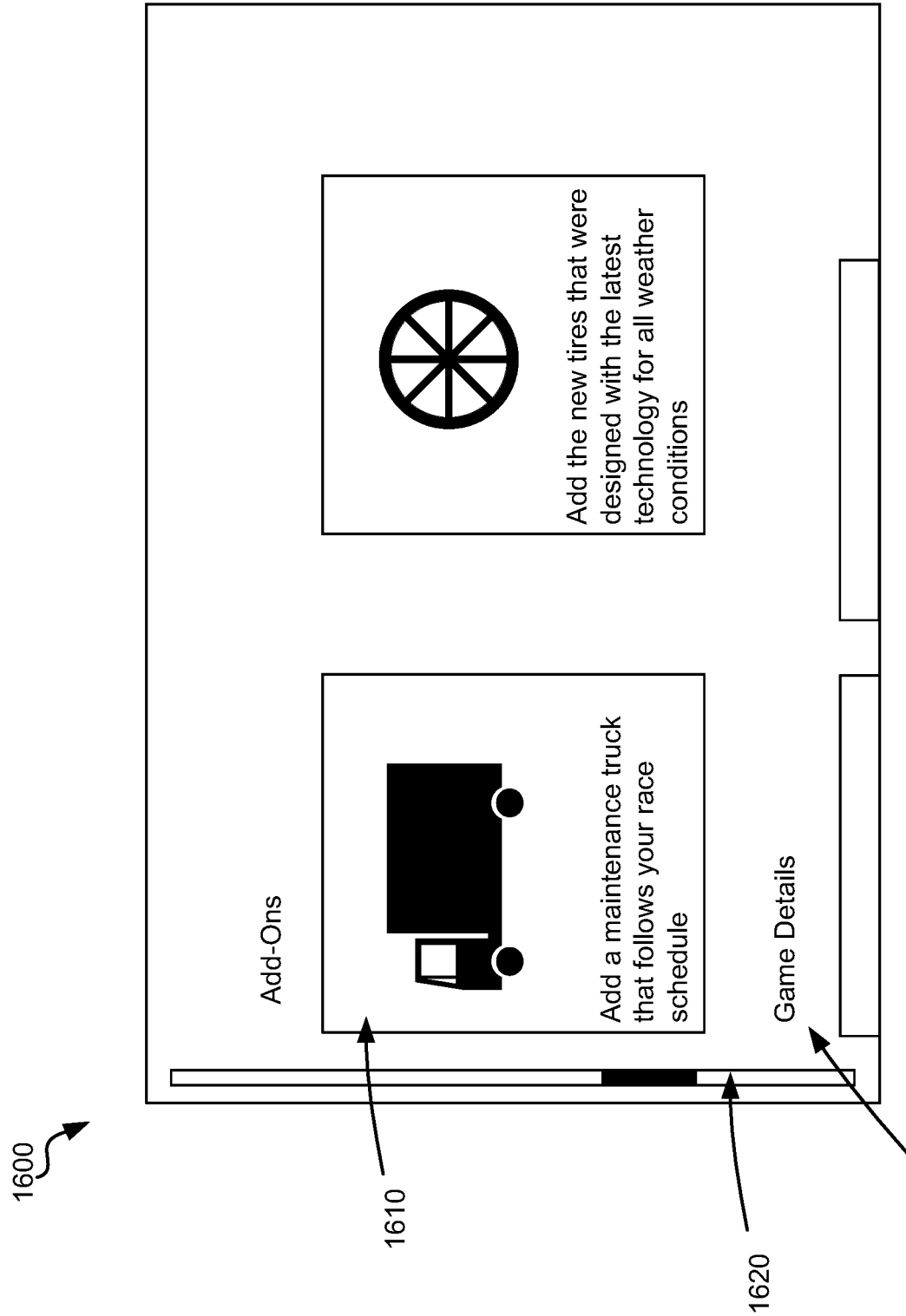
FIG. 16 illustrates an example of a sixth section of a video game page in a second phase of a video game lifecycle, according to embodiments of the present disclosure.

FIG. 16 illustrates an example of a sixth section of a video game page 1600 in a second phase of a video game lifecycle, according to embodiments of the present disclosure. Here, the second phase is a release phase and the sixth section is an add-ons section. The add-ons section includes a plurality of tiles 1610, each presenting information about an add-on that can be acquired for the video game (e.g., an add-on can correspond to program code that provides a new video game functionality, such as a new tool to use, a new level to play, etc.). The add-ons section is scrollable, as illustrated with a scroll bar 1620 and, at the bottom of the GUI, the top of the next scrollable section 1630 is shown (as illustrated, this section 1630 is a game details section).

Generally, the add-ons section is a programmatically generated strand based on metadata and assets. The metadata and assets can be received from the developer via the content pipeline and include key art, add-on graphic like avatar or a theme product name, and pricing.

Figure 17:
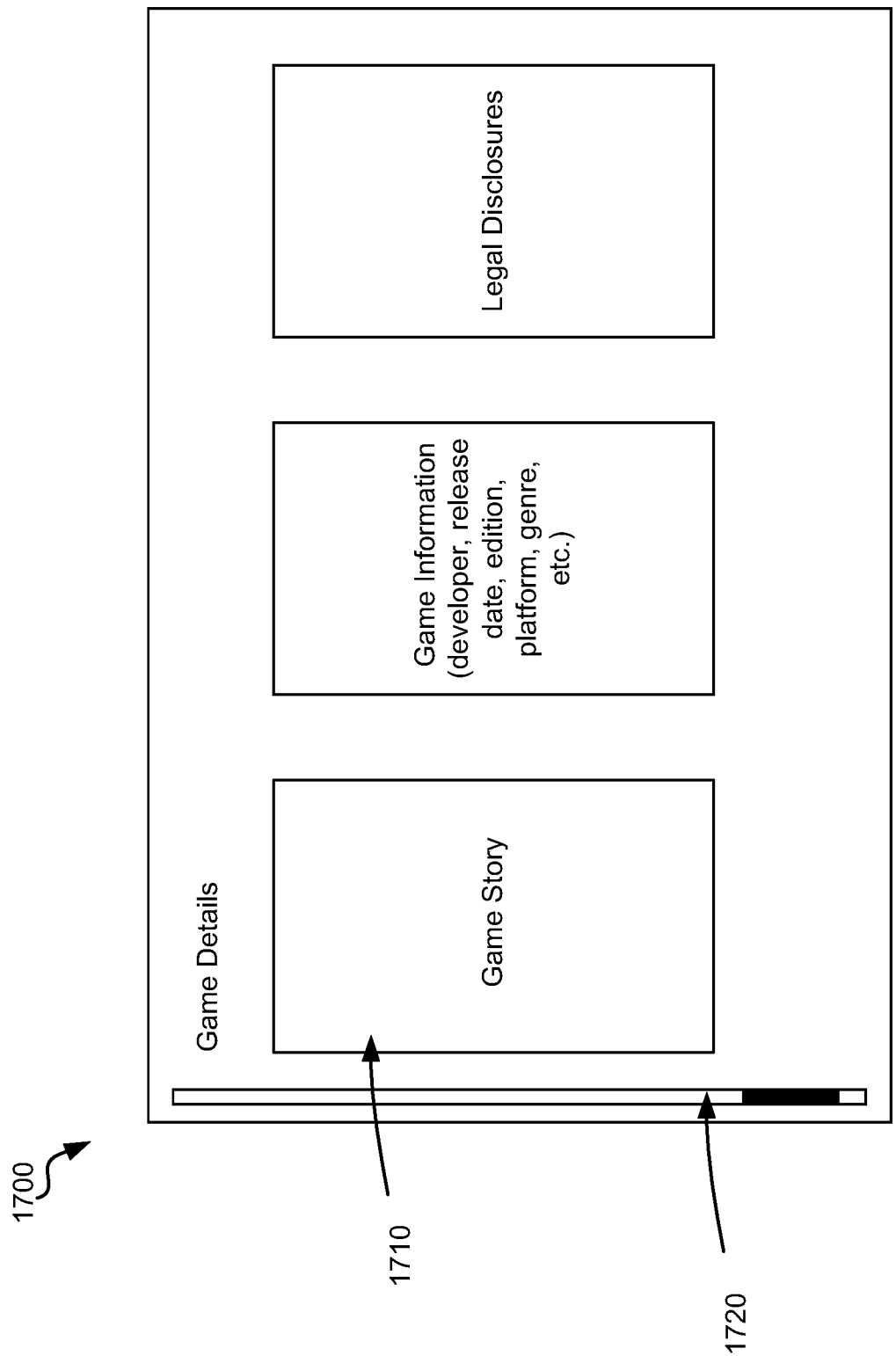
FIG. 17 illustrates an example of a seventh section of a video game page in a second phase of a video game lifecycle, according to embodiments of the present disclosure.

FIG. 17 illustrates an example of a seventh section of a video game 1700 page in a second phase of a video game lifecycle, according to embodiments of the present disclosure. Here, the second phase is a release and the seventh section is a game details section. The game details section is generally similar to the game details section of FIG. 10, except that it may include any additional updates (e.g., an actual release date, identifies of different versions, etc.). The game details section includes one or more tiles 1710, each embedding a link to a details page about the video game, such as a game story, game information (developer, release, date, edition, platform, genre, etc.) and legal disclosure. The game features section is scrollable, as illustrated with a scroll bar 1720.

Generally, the game details section is a programmatically generated section with detailed game information powered by the content pipeline. Some of the content received via the content pipeline includes marketing text, genre, developer display name, display release date, legal copy including copyright information and account membership requirements, and compatibility notices.

Figure 18:
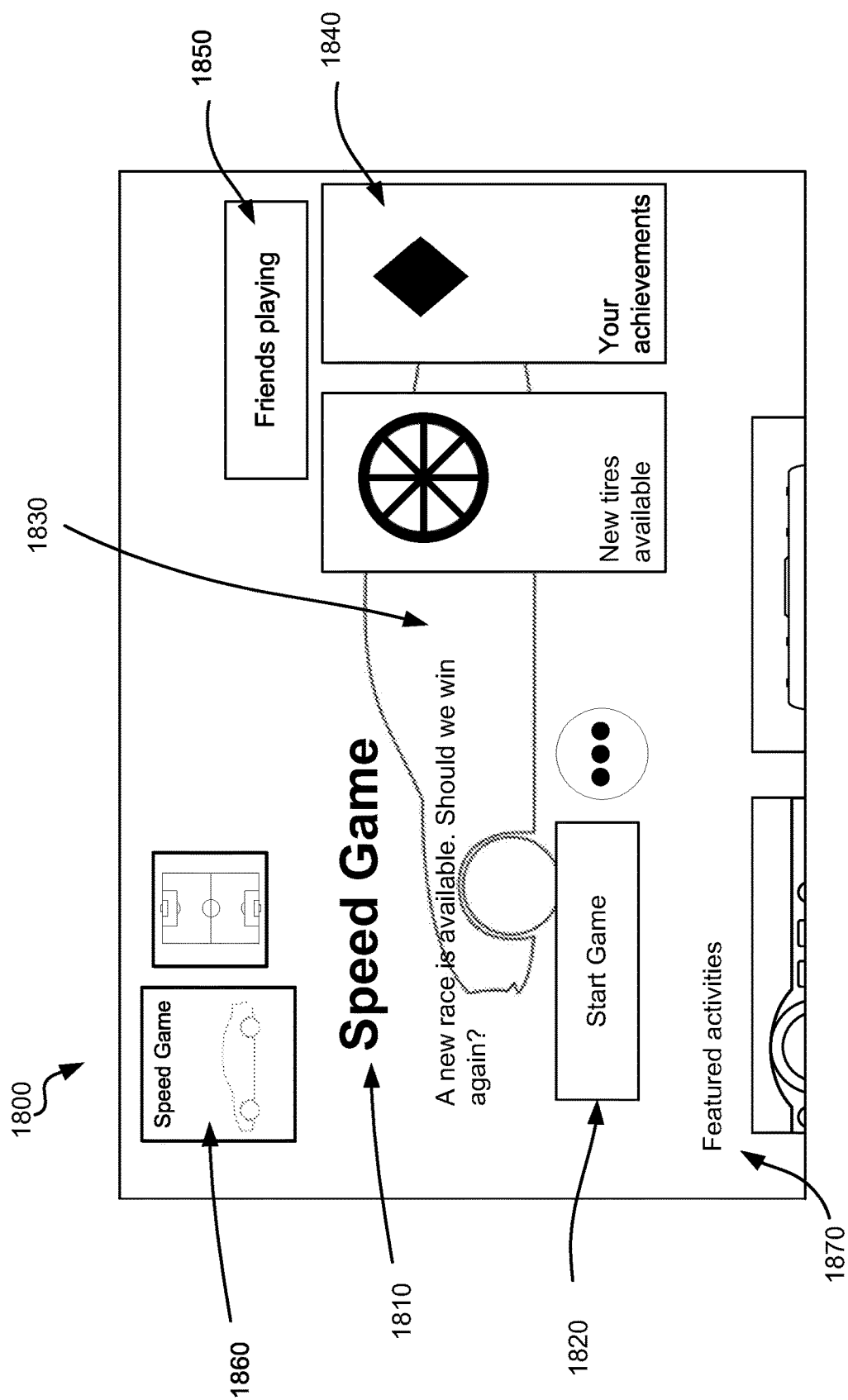
FIG. 18 illustrates an example of a first section of a video game page in a third phase of a video game lifecycle, according to embodiments of the present disclosure.

FIG. 18 illustrates an example of a first section of a video game page 1800 in a third phase of a video game lifecycle, according to embodiments of the present disclosure. Here, the third phase is a post-acquisition phase and the first section is a cover section. Context of a user of the video game page 1800 can be used to customize the video game page 1800. The cover section is generally similar to the cover section of FIG. 11, except here the cover section includes additional information about the video game and is further customizes to the user context. In the cover section of FIG. 18, a short description 1810 of the video game is presented (e.g., game title, and an invitation to play a particular feature of the video game that has not been played by the user yet). The cover section also includes action buttons 1820. Given that the video game was acquired, the action buttons 1820 include a start game button to launch the video game. Other actions can be grouped under an expandable menu button (shown as a circle with three dots). In addition, the cover section shows a cover art 1830 of the video game. The cover section further informs the user about the game information as shown in a tile 1840, where the information is targeted to the user given their context. For instance, one tile may show a new feature that the user may not have acquired but may be interested, while another tile may show the user's game achievements. In addition, the cover page can show a summary 1850 (e.g., a number of and avatars) of friends that are playing the video game. At the top of the cover section, various tiles 1860 are presented and show available video games to the user. These tiles 1860 can be scrollable in a carousel-like manner and the tile corresponding to the video game page 1800 is in focus and is shown with an enlarged size (or some other visual indicator that distinguishes it over remaining tiles). A user selection of another one of the tiles 1860 (e.g., a scroll thereto or a click thereon) causes a presentation of a second video game page for a second video game page. The same video game application may be instantiated, where one instance may be used for the video game page 1800 and a second instance for the second video game page. At the bottom of the GUI, the top of the next scrollable section 1870 is shown (as illustrated, this section 1870 is a featured activities section).

Generally, the cover section contains a set of information most relevant for user retention (whereas in the announcement and release phases, the information is most relevant for user conversion). The concept level cover art may be used, but can be overwritten by either a news take over story, or a unified activity module. Developers can explicitly select a news story to take over the cover art via the content pipeline. If a news take over story does not exist for a given game, the most relevant unified activity module game plan may be shown in the cover instead. In addition to the take-over capability, a different news story can be displayed in tile format along with an achievement tile on the right hand side of the cover section. The cover section layout maximizes the developer's ability to keep users up to date on new content launches, patches/updates to the game, upcoming events, and the like.

Figure 19:
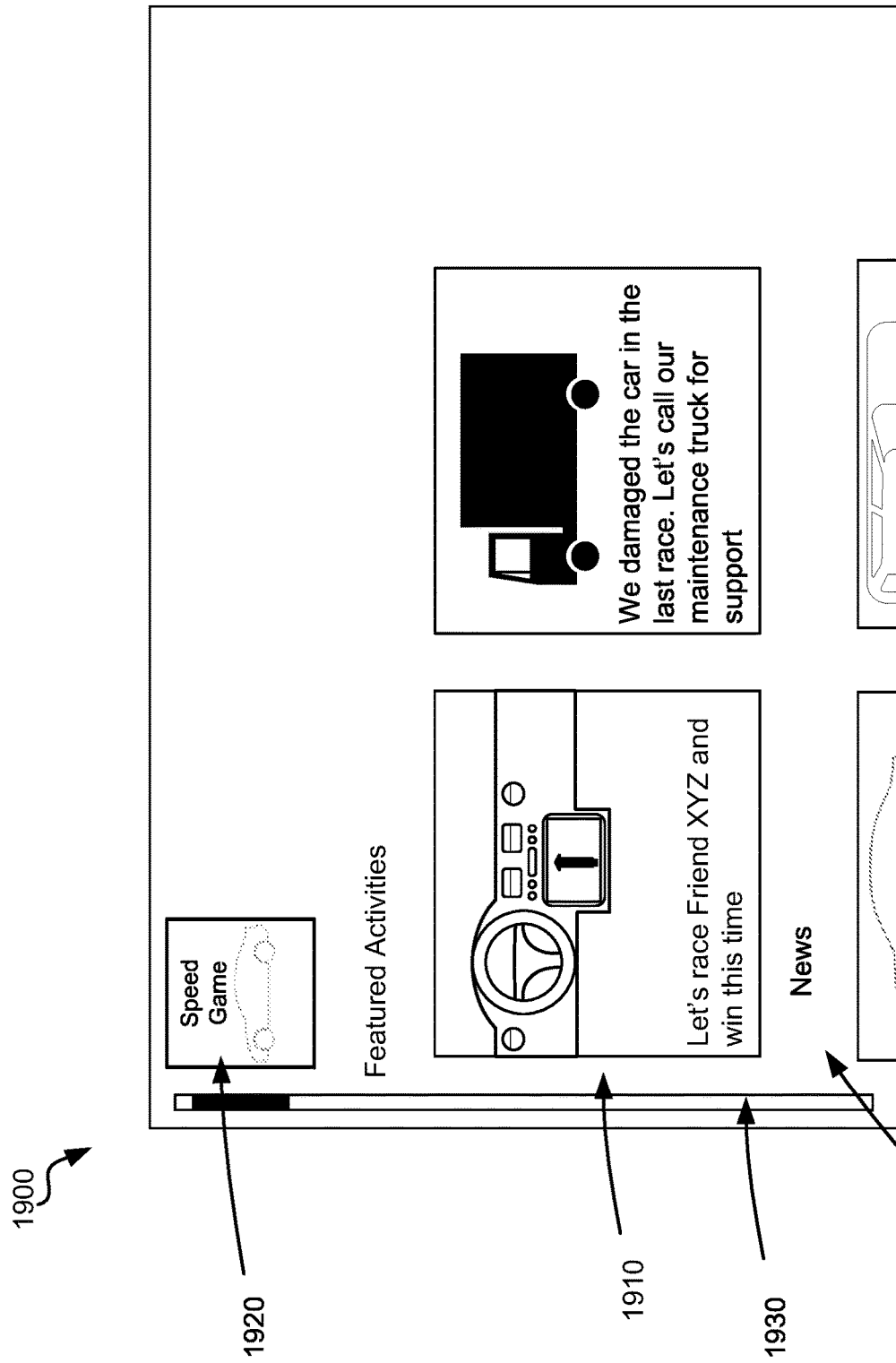
FIG. 19 illustrates examples of a second section of a video game page in a third phase of a video game lifecycle, according to embodiments of the present disclosure.

FIG. 19 illustrates examples of a second section of a video game page 1900 in a third phase of a video game lifecycle, according to embodiments of the present disclosure. Here, the third phase is a post-acquisition phase and the second section is a featured activities section. The featured activities section presents tiles 1910, each informing a user about an activity that can be relevant to the user. Each tile may be selected to launch the corresponding activity. The different available activities in the video game can be ranked according to the user context and the most relevant ones can be presented in the tiles 1910. In this way, the user need not search and navigate between different parts of the video game platform to find interesting activities. The cover section also identifies the video game by using a tile 1920. The add-ons section is scrollable, as illustrated with a scroll bar 1930 and, at the bottom of the GUI, the top of the next scrollable section 1940 is shown (as illustrated, this section 1940 is a news section).

Generally, the features activities section includes a collection of unified activity modules, where the most relevant and engaging play opportunities are exposed. The purpose of this section is to maximize play time and minimize the time needed to find the next play opportunity.

Figure 20:
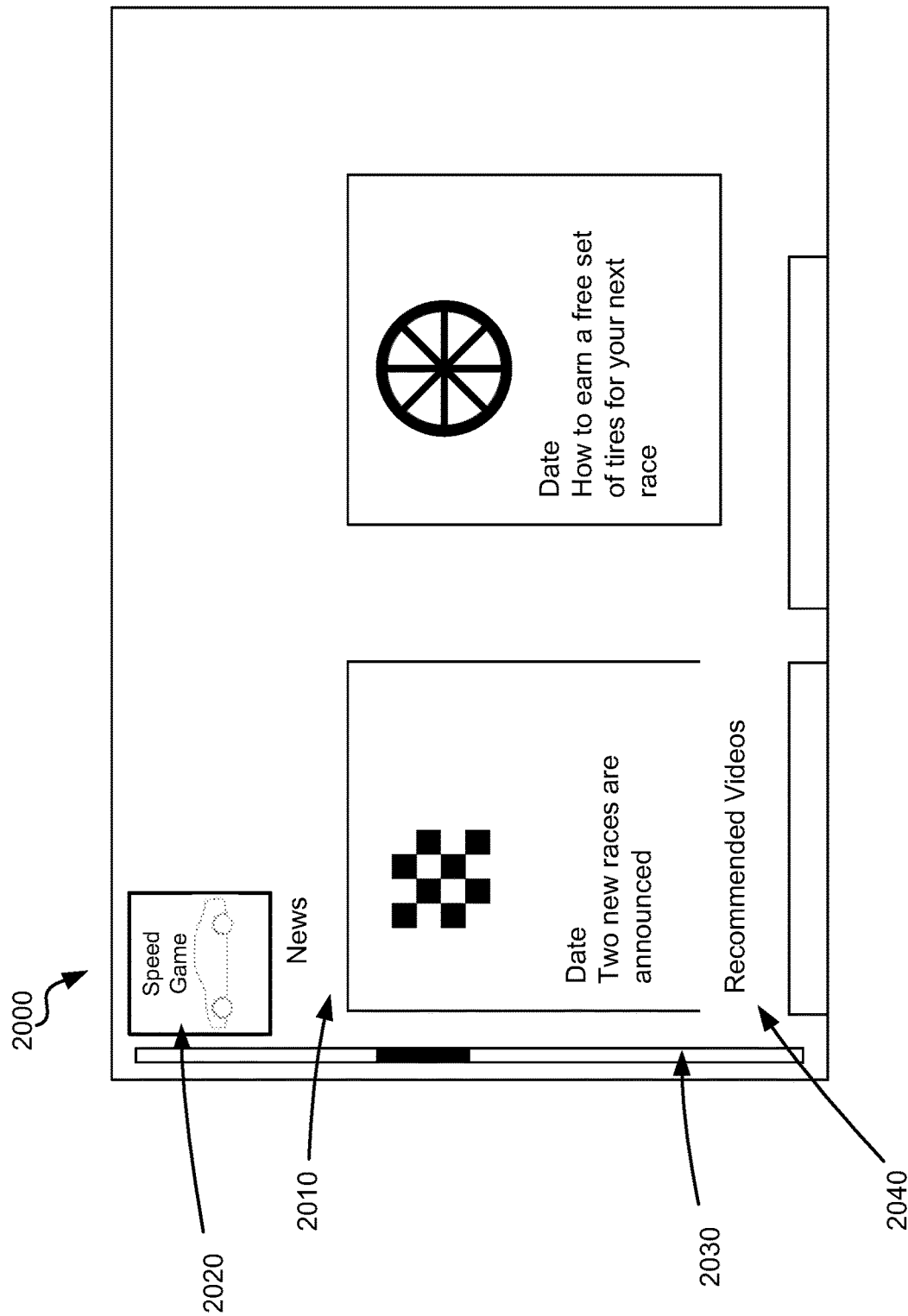
FIG. 20 illustrates an example of a third section of a video game page in a third phase of a video game lifecycle, according to embodiments of the present disclosure.

FIG. 20 illustrates an example of a third section of a video game page 2000 in a third phase of a video game lifecycle, according to embodiments of the present disclosure. Here, the third phase is a post-acquisition phase and the third section is a news section. The news section is generally similar to the news section of FIG. 14, except additional news feeds may be available and such news feeds can be selected and organized depending on the user context. As illustrated in FIG. 20, the news section includes a plurality of tiles 2010, each embedding a link to a news feed (e.g., text article, audio file, and/or video file) about the video game. An included tile shows covert art and a new synopsis that is relevant to the user's game play. The news section also identifies the video game by using a tile 2020. The news section is scrollable, as illustrated with a scroll bar 2030 and, at the bottom of the GUI, the top of the next scrollable section 2040 is shown (as illustrated, this section 2040 is a recommended videos section).

Generally, developers can submit news stories via the content pipeline and target such stories for post-acquisition activities. News content such as upcoming events, additional content coming soon, game patches that address a particular problem, updates to the game etc. could help continuously engage users throughout their gameplay lifecycle phases.

Figure 21:
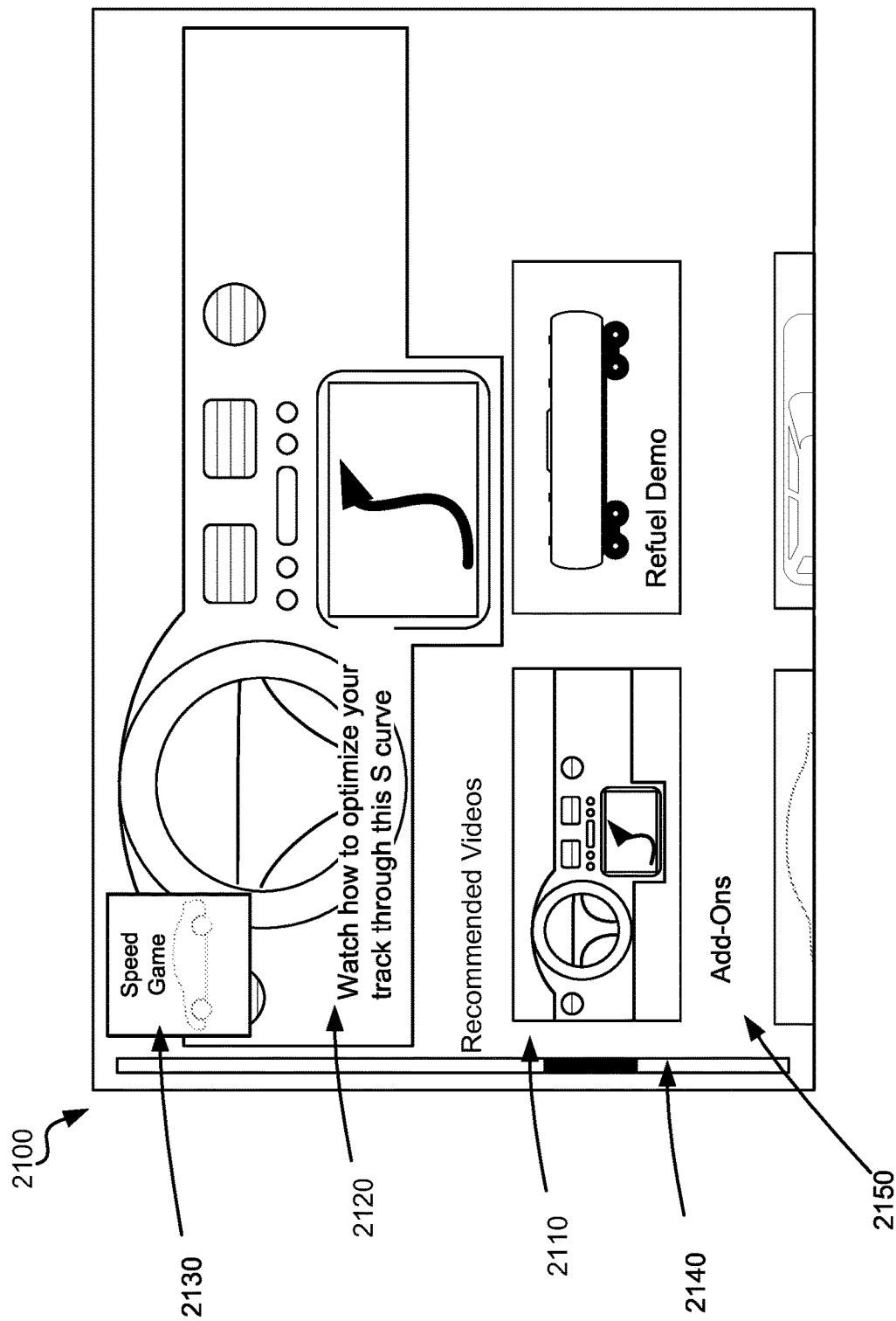
FIG. 21 illustrates an example of a fourth section of a video game page in a third phase of a video game lifecycle, according to embodiments of the present disclosure.

FIG. 21 illustrates an example of a fourth section of a video game page 2100 in a third phase of a video game lifecycle, according to embodiments of the present disclosure. Here, the third phase is a post-acquisition phase and the fourth section is a recommended videos section. The recommended videos section shows links to videos demonstrating how to perform certain activities in the video game given the user context (e.g., the videos can be relevant to the user and/or to the user's gameplay). These videos can be uploaded by the developer or can be retrieved from a third party system. As illustrated in FIG. 21, the recommended videos section includes a plurality of tiles 2110, each embedding a link to a video file. An included tile shows a frame of the video file. A background 2120 of the media section is set to the frame and includes a short description of a feature of the video game, at least when the included tile is in focus. When the video is selected, the video can be played in the area that presents the background 2120 and can be expanded to be played over the entire viewing area. In addition, absent a user selection and when in focus, the video can start automatically in the area of the background 2120 without audio. In certain situations, the user may not have performed an activity and presenting information about this activity can be considered as a spoiler. Whether the user has performed the activity can be determined from the user context. Whether a video presents information about the activity can be defined in the metadata of the video, including where in the video (e.g., timestamps) the information is presented. Hence, based on the user context and the video metadata, the video game platform may determine whether a spoiler is about to be presented in a video to the user. If so, the recommended video sections may present a pop-up window or some other form of notification in, for instance, the video game page to alert the user about the upcoming spoiler. Only if the user opts in to view it, the spoiler is presented in the video. Otherwise, that portion of the video is skipped (e.g., the presentation of the spoiler is blocked in the video game page). Additionally or alternatively, a user setting may specify that spoilers should be skipped or presented. The video is presented according to the user setting. The recommended videos section also identifies the video game by using a tile 2130. The recommended videos section is scrollable, as illustrated with a scroll bar 2140 and, at the bottom of the GUI, the top of the next scrollable section 2150 is shown (as illustrated, this section 2150 is an add-ons section).

Generally, users can view either current broadcasts or uploaded videos related to the video game. User-generated videos enrich the users' play activities by connecting them with other users to learn from others how play the video game, and allows them to shift from an active entertainment mode to a passive one while still engaged with the video game.

Figure 22:
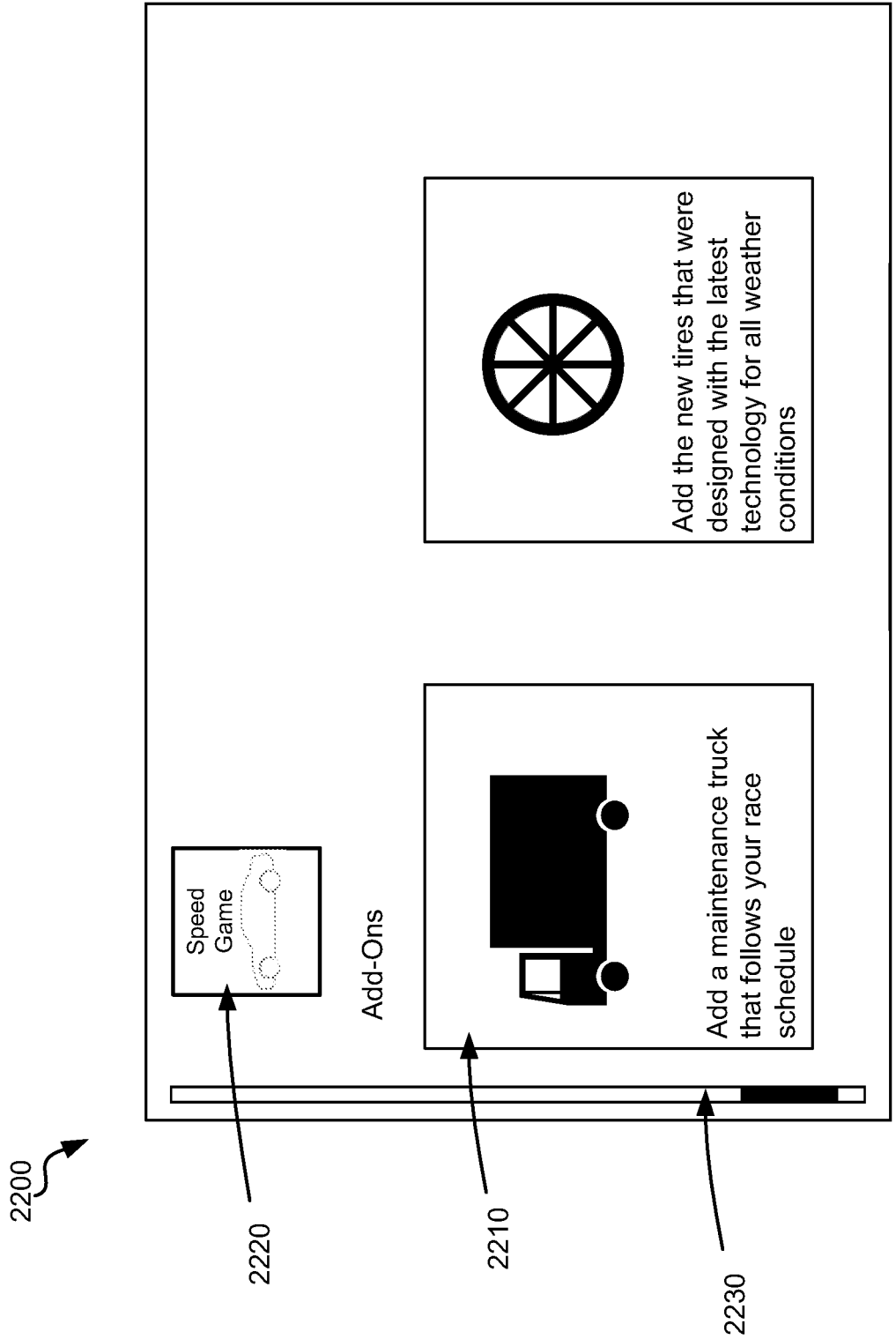
FIG. 22 illustrates an example of a fifth section of a video game page in a third phase of a video game lifecycle, according to embodiments of the present disclosure.

FIG. 22 illustrates an example of a fifth section of a video game page 2200 in a third phase of a video game lifecycle, according to embodiments of the present disclosure. Here, the third phase is a post-acquisition phase and the fifth section is an add-ons section. Context of a user of the video game page 2200 can be used to customize the add-ons section by selecting the add-ons that are relevant to the context. The add-ons section is generally similar to the add-ons section of FIG. 16. The add-ons section includes a plurality of tiles 2210, each presenting information about an add-on that is either available to the user in the video game or that can be acquired for the video game. The add-ons section also identifies the video game by using a tile 2220. The add-ons section is scrollable, as illustrated with a scroll bar 2230.

Generally, the add-ons section is a programmatically generated strand based on metadata and assets. The metadata and assets can be received from the developer via the content pipeline and include key art, add-on graphic like an avatar or a theme product name, and pricing.

As explained herein above, a video game application presents a video game page throughout the different phases such that the video game page is a single user interface accessible to a user in all phases and providing the necessary information and functionalities for each phase. The layout of the video game page can be pre-defined by a service provider and, optionally, customized by a developer. The predefined layout is common to multiple video games to enable a common user experience for the different video games. Some of the content can be defined by the developer, while other content can be defined by the service provider and/or a third party (e.g., user generated content).

Any of the actions can be defined as program code of the video game application or of a second application depending on the action itself. For instance, if the action is to present a video or to complete a purchase, such action can be part of the second application. In this case, the video game page presents a link to the action. Upon a selection of the link, the second application can execute the relevant process and a window about the process is presented over a portion of the video game page. The user control can be automatically switched to the window (e.g., the user need not provide specific user input at a game controller to select the window; instead, the user input can be automatically associated with the window). Upon completion of the process, the window can be automatically closed and the user control can be automatically switched back to the video game page.

To illustrate, and referring to the acquire button in FIG. 11, upon a user selection of this button, a payment application may be launched to complete a payment process. A window is presented over some or all of the cover section, where the window provides payment related information and functionalities (e.g., payment account to use, payment amount, etc.). User input can be automatically associated with the window to complete the payment process. Thereafter, the window is closed and the user control is switched back to the cover section. In this case, the completion of the payment process causes a change to user context: the video game is added to the user account. In turn, this user context change results in a change to the lifecycle phase: from pre-acquisition to post-acquisition. Accordingly, the video game page is automatically updated such to the post-acquisition layout and is automatically customized to the user. For instance, the cover section of FIG. 18 would be automatically presented upon the completion of the payment process and the closing of the related window. In addition, a link to the video game page can be embedded in a second page (e.g., a user interface) of a second application that presents information about a plurality of video games available to the user. For instance, the link can be embedded as a tile in a storefront, library, etc. In an example, in a post-acquisition phase, upon a user selection to acquire the video game (e.g., purchase, download, install, etc.), the link can be automatically embedded in many of such second pages including the storefront, library, etc.

Figure 23:
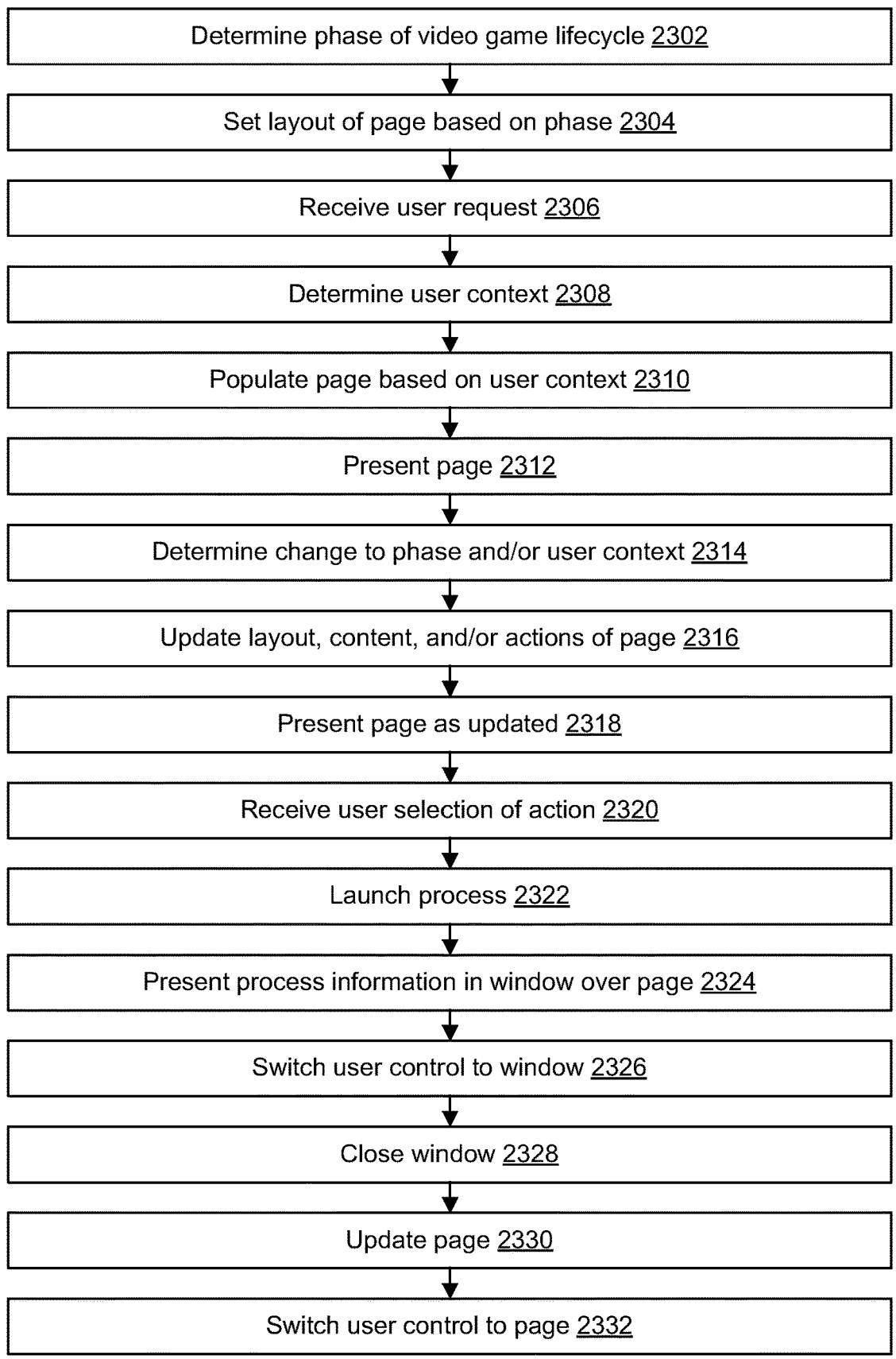
FIG. 23 illustrates an example of a flow for presenting a video game page, according to embodiments of the present disclosure.

FIG. 23 illustrates an example of a flow for presenting a video game page, according to embodiments of the present disclosure. The operations of the flow can be implemented as hardware circuitry and/or stored as computer-readable instructions on a non-transitory computer-readable medium of a computer system, such as a video game console and/or a video game platform. As implemented, the instructions represent modules that include circuitry or code executable by a processor(s) of the computer system. The execution of such instructions configures the computer system to perform the specific operations described herein. Each circuitry or code in combination with the processor represents a means for performing a respective operation(s). While the operations are illustrated in a particular order, it should be understood that no particular order is required and that certain operations can be omitted.

In an example, the flow includes operation 2302, where the computer system determines a phase of a video game lifecycle. For instance, the computer system can provide a computing pipeline that receives input of a developer of a video game and/or a service provider. The input can indicate the phase and the computer system may store information that identifies the phase in association with the video game according to the input. In this case, determining the phase includes looking at the information by using an identifier of the video game. Further, the phase can also depend on a context of a user of the video game (e.g., was the video game added to the user's wish list, was the game acquired by the user). In this case, determining the phase includes looking up the user context by using an identifier of the user.

In an example, the flow includes operation 2304, where the computer system sets a layout of the video game page based on the phase. For instance, layout templates are stored in association between different phases based on input of the service provider. Input of the developer can be further received to select and/or, optionally, customize a layout for each of the phases. In this case, setting the layout includes looking up the layout templates by using an identifier of the phase, selecting the applicable layout template, and generating a video game page template according to the layout template. Here also, content and actions applicable to the phase can be included in the video game page template, where their arrangement is specified by the layout template.

In an example, the flow includes operation 2306, where the computer system receives a user request for information about the video game. For instance, the user request can be received as user input from an input device that the user operates (e.g., a game controller). The user input can be received as a user selection of a link to the video game page. This link can be presented on a home screen, in a library, in an application store, or in any other user interface to an application. The link can be automatically embedded in the home screen, library, application store upon the generating of the video game page or the video game page template.

In an example, the flow includes operation 2308, where the computer system determines the user context. For instance, the computer system uses the identifier of the user to look up the user context from a profile of the user.

In an example, the flow includes operation 2310, where the computer system populates the video game page based on the user context. For instance, the computer system customizes the content and/or the actions associated with the phase such that the customized content and/or actions are relevant to the user context. The customization can include ranking the content and/or actions based on their relevance to the user context and arranging them for presentation based on the ranking. The customization can also include selecting some of the content and/or actions and filtering out other ones if their ranking is low (e.g., below a ranking score). The customization can include personalizing some of the content and/or actions with information about the user, such as by including the user name, identifying a last game achievement, etc. Further, the customization can include adding new content specific to the user (e.g., by determining a history of the user playing the video game, where the history is indicated by the user context and includes, for instance, any of game play information such as achievements, such as trophies, earned skills, and statistics, and adding particular content that indicates the history such as by showing the trophies, skills, achievements, statistics, etc.). In addition, the customization can include identifying spoilers and, as applicable, generating alerts about such spoilers. The customized content and/or actions can be arranged according to the layout of the phase, thereby updating the video game page template to be specific to the user context. The updated video game page template corresponds to the video game page.

In an example, the flow includes operation 2312, where the computer system presents the video game page. For instance, the video game page is presented within a GUI on a display to the user in response to the user request.

In an example, the flow includes operation 2314, where the computer system determines a change to the phase of the lifecycle or to the user context. For instance, input of the developer and/or service provider can be received and can indicate that the video game has moved to a second phase (e.g., from an announcement phase to a release phase). This input can be stored as information that identifies the second phase in association with the video game. The user context can also indicate the change (e.g., upon an acquisition of the game, the phase changes to a post-acquisition phase). The user context can also indicate other changes that relate to activities (e.g., gameplay) of the user and/or other users (e.g., friends of the user) in association with the video game or the video game platform. As such, determining the change includes looking up the stored information by using the identifier of the video game and/or looking up the user context by using the identifier of the user.

In an example, the flow includes operation 2316, where the computer system updates any of the layout, content, and/or actions of the page. For instance, the change to the phase can result in a selection of a new layout template, where this layout template removes some of the sections, edits and/or re-arranges remaining sections, and/or adds new sections to result in an update to the video game page template. Content and actions of the updated video game template can be customized based on the user context (or the change thereto), resulting in an updated video game page.

In an example, the flow includes operation 2318, where the computer system presents the updated video game page. For instance, the updated video game page is presented within the GUI on the display.

In an example, the flow includes operation 2320, where the computer system receives a user selection of an action presented in the video game page. For instance, the action is linked to program code of one or more applications configured to execute one or more processes identified by the action (e.g., if the action is for acquiring the video game, the process(es) can include completing payment, downloading the game, etc.).

In an example, the flow includes operation 2322, where the computer system launches the process. For instance, the relevant program code is executed.

In an example, the flow includes operation 2324, where the computer system presents process information in a window over the video game page. For instance, the window is a user interface to the underlying application(s) executing the process(es).

In an example, the flow includes operation 2326, where the computer system switches controls to the window. For instance, the switch is automatic such that input of the user is automatically associated with the underlying application(s).

In an example, the flow includes operation 2328, where the computer system closes the window upon completion of the process(es). For instance, the execution of the underlying application(s) is terminated.

In an example, the flow includes operation 2330, where the computer system updates the video game page. For instance, operation 2330 can be similar to operations 2314-2318 above. In particular, the completion of the process(es) may have resulted in a change to the phase and/or user context. The change is determined to update the video game page and present the updated video game page.

In an example, the flow includes operation 2332, where the computer system switches controls to the video game page. For instance, the switch is automatic such that input of the user is automatically associated with the video game page.

Figure 24:
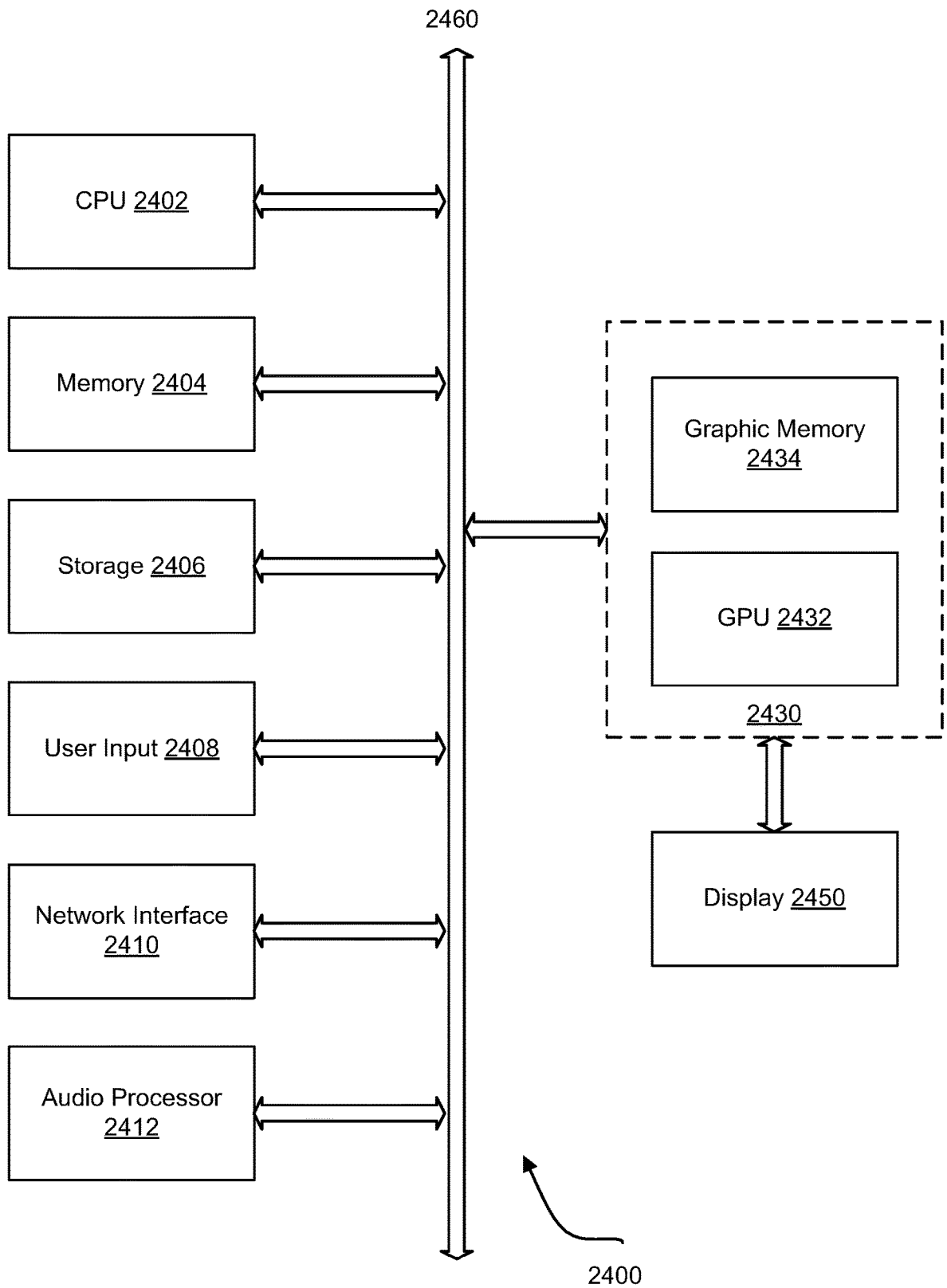
FIG. 24 illustrates an example of a hardware system suitable for implementing a computer system, according to embodiments of the present disclosure.

FIG. 24 illustrates an example of a hardware system suitable for implementing a computer system 2400, according to embodiments of the present disclosure. The computer system 2400 represents, for example, a video game console, a video game platform, or other types of a computer system. The computer system 2400 includes a central processing unit (CPU) 2402 for running software applications and optionally an operating system. The CPU 2402 may be made up of one or more homogeneous or heterogeneous processing cores. Memory 2404 stores applications and data for use by the CPU 2402. Storage 2406 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 2408 communicate user inputs from one or more users to the computer system 2400, examples of which may include keyboards, mice, joysticks, touch pads, touch screens, still or video cameras, and/or microphones. Network interface 2410 allows the computer system 2400 to communicate with other computer systems via an electronic communications network, and may include wired or wireless communication over local area networks and wide area networks such as the Internet. An audio processor 2412 is adapted to generate analog or digital audio output from instructions and/or data provided by the CPU 2402, memory 2404, and/or storage 2406. The components of computer system 2400, including the CPU 2402, memory 2404, data storage 2406, user input devices 2408, network interface 2410, and audio processor 2412 are connected via one or more data buses 2460.

A graphics subsystem 2430 is further connected with the data bus 2460 and the components of the computer system 2400. The graphics subsystem 2430 includes a graphics processing unit (GPU) 2432 and graphics memory 2434. The graphics memory 2434 includes a display memory (e.g., a frame buffer) used for storing pixel data for each pixel of an output image. The graphics memory 2434 can be integrated in the same device as the GPU 2432, connected as a separate device with the GPU 2432, and/or implemented within the memory 2404. Pixel data can be provided to the graphics memory 2434 directly from the CPU 2402. Alternatively, the CPU 2402 provides the GPU 2432 with data and/or instructions defining the desired output images, from which the GPU 2432 generates the pixel data of one or more output images. The data and/or instructions defining the desired output images can be stored in the memory 2404 and/or graphics memory 2434. In an embodiment, the GPU 2432 includes 3D rendering capabilities for generating pixel data for output images from instructions and data defining the geometry, lighting, shading, texturing, motion, and/or camera parameters for a scene. The GPU 2432 can further include one or more programmable execution units capable of executing shader programs.

The graphics subsystem 2430 periodically outputs pixel data for an image from the graphics memory 2434 to be displayed on the display device 2450. The display device 2450 can be any device capable of displaying visual information in response to a signal from the computer system 2400, including CRT, LCD, plasma, and OLED displays. The computer system 2400 can provide the display device 2450 with an analog or digital signal.

In accordance with various embodiments, the CPU 2402 is one or more general-purpose microprocessors having one or more processing cores. Further embodiments can be implemented using one or more CPUs 2402 with microprocessor architectures specifically adapted for highly parallel and computationally intensive applications, such as media and interactive entertainment applications.

The components of a system may be connected via a network, which may be any combination of the following: the Internet, an IP network, an intranet, a wide-area network ("WAN"), a local-area network ("LAN"), a virtual private network ("VPN"), the Public Switched Telephone Network ("PSTN"), or any other type of network supporting data communication between devices described herein, in different embodiments. A network may include both wired and wireless connections, including optical links. Many other examples are possible and apparent to those skilled in the art in light of this disclosure. In the discussion herein, a network may or may not be noted specifically.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain. "About" includes within a tolerance of ±0.01%, ±0.1%, ±1%, ±2%, ±3%, ±4%, ±5%, ±8%, ±10%, ±15%, ±20%, ±25%, or as otherwise known in the art. "Substantially" refers to more than 66%, 155%, 80%, 90%, 95%, 99%, 99.9% or, depending on the context within which the term substantially appears, value otherwise as known in the art.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method implemented by a computer system for presentation of video game-related information, the method comprising:
   determining a phase of a lifecycle of a video game, wherein a set of content and actions associated with the video game are generated specifically for the phase;
   setting a layout of a page associated with the video game based on the phase, wherein the page is updated based on different phases of the lifecycle and is accessible in each of the different phases to a user;
   receiving a request of the user for information about the video game;
   determining a context of the user in association with at least one of the video game or a video game platform from which the video game is available;

populating the page with the content and the actions, wherein at least one of the content or the actions is customized based on the context; and presenting, in response to the request, the page as populated and according to the layout.

2. The method of claim 1, further comprising:

determining a change to at least one of: the lifecycle from the phase to a second phase or the context of the user; and updating, based on the change, at least one of: the layout, the content, or the actions.

3. The method of claim 1, further comprising:

receiving a user selection of an action presented in the page;

determining that the lifecycle changed from the phase to a second phase based on the action; and updating, based on the second phase, at least one of: the layout, the content, or the actions.

4. The method of claim 3, further comprising:

performing the action by at least:
  launching a process associated with the action,
  presenting information about the process in a window over the page, and
  switching a user control from the page to the window; and upon a completion of the process:
  closing the window,
  switching the user control to the page, and
  presenting the page as updated.

5. The method of claim 1, wherein the layout comprises a plurality of scrollable sections, and wherein each of the sections comprises an arrangement of content, actions, and tiles based on the phase.

6. The method of claim 5, wherein presenting the page comprises presenting a full scrollable section while also presenting a top of a next scrollable section.

7. The method of claim 6, wherein the full scrollable section comprises a tile selectable to present a video file associated with the game, and wherein a background of the full scrollable section is set as a frame from the video file.

8. The method of claim 6, wherein at least one of content, an action, and a tile presented in the full scrollable section is customized based on the context of the user.

9. The method of claim 5, further comprising:

determining a change from the phase to a second phase of the lifecycle; and adding a new scrollable section to the page based on the change, wherein at least one of additional content or an action are generated specifically for the second phase and are included in the new scrollable section.

10. The method of claim 1, wherein the layout comprises a first set of scrollable sections for an announce phase of the lifecycle, a second set of scrollable sections for a launched video game phase of the lifecycle, and a third set of scrollable sections for a user acquired video game phase of the lifecycle, wherein the first set and the second set comprise a common scrollable section, and wherein the second set comprises a scrollable section absent from the first set.

11. The method of claim 10, wherein the first set comprises a cover section, a game media section, a game features section, a news section, and a game details section, wherein the second set comprises the cover section, the game media section, the game features section, the news section, and an add-ons section, wherein the third set comprises the cover section, the add-ons section, a featured activities section, the news section, and a user generated content section, and wherein at least one of content or an action in the common scrollable section changes between the first set and the second set.

12. The method of claim 1, wherein the phase is a post-acquisition phase, and wherein the at least one of the content or the actions is customized by:

determining a history of the user playing the video game, wherein the history is indicated by the context and comprises at least one of: achievements of the user, statistics of the user, or video game skills earned by the user; and adding particular content to the page, wherein the particular content indicates the history.

13. A computer system comprising:

one or more processors; and one or more memories storing computer-readable instructions that, upon execution by the one or more processors, configure the computer system to:

determine a phase of a lifecycle of a video game, wherein a set of content and actions associated with the video game are generated specifically for the phase;

set a layout of a page associated with the video game based on the phase, wherein the page is updated based on different phases of the lifecycle and is accessible in each of the different phases to a user;

receiving a request of the user for information about the video game;

determine a context of the user in association with at least one of the video game or a video game platform from which the video game is available;

populate the page with the content and the actions, wherein at least one of the content or the actions is customized based on the context; and present, in response to the request, the page as populated and according to the layout.

14. The computer system of claim 13, wherein the layout is set prior to receiving the request, wherein the request is received based on a user selection of a link to the page, and wherein the page is populated after the user selection of the link.

15. The computer system of claim 13, wherein the execution of the instructions further configures the computer system to:

launch an instance of an application based on receiving the request, and wherein the instance populates the page.

16. The computer system of claim 15, wherein the execution of the instructions further configures the computer system to:

receive a second request for information about a second video game;

launch a second instance of the application; and populate, by the second instance, a second page based on the context of the user and a phase of a lifecycle of the second video game.

17. The computer system of claim 13, wherein the layout is set based on a layout template that is defined specifically for the phase and that is common to a plurality of video games.

18. A non-transitory computer-readable medium storing instructions that, upon execution on a computer system, cause the system to perform operations comprising:

determining a phase of a lifecycle of a video game, wherein a set of content and actions associated with the video game are generated specifically for the phase;

setting a layout of a page associated with the video game based on the phase, wherein the page is updated based on different phases of the lifecycle and is accessible in each of the different phases to a user;

receiving a request of the user for information about the video game;

determining a context of the user in association with at least one of the video game or a video game platform from which the video game is available;

populating the page with the content and the actions, wherein at least one of the content or the actions is customized based on the context; and presenting, in response to the request, the page as populated and according to the layout.

19. The non-transitory computer-readable medium of claim 18, wherein the phase is a pre-acquisition phase, wherein the actions comprise a video game acquire action that is located in the page based on the layout, and wherein the operations further comprise:

receiving a user selection of the video game acquire action;

determining that the lifecycle changes to a post-acquisition phase;

updating the page to present a video game play action based on the post-acquisition phase; and embedding a link to the page in a second page that presents information about a plurality of video games available to the user.

20. The non-transitory computer-readable medium of claim 19, wherein the video game page includes a video about the video game, and wherein the operations further comprise:

determining that the video comprises a spoiler based on the context of the user; and based on the spoiler, performing at least one of: blocking a portion of the video that contains the spoiler from a presentation in the video game page or presenting an alert to the user in the video game page about the spoiler.

21. The non-transitory computer-readable medium of claim 18, wherein the phase is a post-acquisition phase, and wherein a link to the page is automatically added to one or more user interfaces other than the page.

* * * * *